DIGIT SENDING MEANS FOR TELEPHONE SYSTEMS

Original Filed April 3, 1956 12 Sheets-Sheet 1

Inventor,
FRANK A. MORRIS
By [signature]
Attorney

May 15, 1962 F. A. MORRIS 3,035,125

DIGIT SENDING MEANS FOR TELEPHONE SYSTEMS

Original Filed April 3, 1956 12 Sheets-Sheet 3

May 15, 1962 F. A. MORRIS 3,035,125

DIGIT SENDING MEANS FOR TELEPHONE SYSTEMS

Original Filed April 3, 1956 12 Sheets-Sheet 7

IDENTIFIER SENDER-700

DIGIT SENDING MEANS FOR TELEPHONE SYSTEMS

Original Filed April 3, 1956 12 Sheets-Sheet 10

IDENTIFIER SENDER ALLOTTER-1200

3,035,125
Patented May 15, 1962

3,035,125

DIGIT SENDING MEANS FOR TELEPHONE SYSTEMS

Frank A. Morris, Fishers, N.Y., assignor to General Dynamics Corporation, Rochester, N.Y., a corporation of Delaware Original application Apr. 3, 1956, Ser. No. 575,798. Divided and this application Aug. 31, 1959, Ser. No. 837,254
16 Claims. (Cl. 179—18)

This invention relates to a telephone system and, more particularly, to an automatic toll ticketing system including new and improved data transmitting means. This application is a division of a prior copending application of F. A. Morris, Serial No. 575,798, filed April 3, 1956, now Patent No. 2,928,904.

In automatic toll ticketing systems, the items of information pertaining to each toll call, such as the called subscriber and the duration of the call, are automatically collected and stored in a reproducible form for subsequent use in preparing statements of charges for subscribers. This automatic storage and collection of information obviates, to a large degree, the necessity for toll operators and the attendant cost thereof. In order to properly assess toll charges against the calling subscriber, the toll ticketing systems must include automatic means for determining the identity of the calling subscriber if the need for toll operators is to be completely obviated. In a system of the type shown in Morris et al. Patent No. 2,886,642, the record of the identity of the calling subscriber is provided by digits dialed by the calling subscriber in obtaining access to the automatic toll ticketing equipment. However, in some applications this type of identification may not be as efficient as desired because a subscriber is required to perform dialing operations in addition to those normally required.

Many other systems have been proposed for automatically identifying calling subscribers without the use of these additional dialing operations by providing automatic line identifying equipment which is common to all of the lines in a particular office or area and which is individually associated with each calling line during the extension of the call to perform the identification operation. This common line identifying equipment is relatively costly so that it is desirable to avoid installing any more of this type of equipment in an office than is necessary to provide adequate service. Since the common calling line identifying equipment is individually assigned to each calling line during the identification operation, the time required to perform a complete identification, when considered in conjunction with the traffic density, is of primary importance in determining the amount of common equipment which is necessary in a particular area.

Accordingly, an object of the present invention is to provide an automatic toll ticketing equipment including new and improved digit storing and sending means.

Another object is to provide a new and improved register sender adapted for use in automatic calling line identifying equipment.

Another object is to provide a register sender including electronic pulsing and control components for increasing the speed of the sending operation.

Another object is to provide a register sender including a multivibrator driven pulsing source and electronic counting means for controlling the cyclic operation of the pulsing source.

In accordance with these and many other objects of the present invention, one embodiment thereof comprises an automatic telephone system having a trunk circuit accessible through conventional switching means. The trunk circuit is provided with an individually associated trunk recorder, which preferably is of the magnetic type, for receiving and storing, in reproducible form, various items of information pertaining to a toll call. In response to the extension of a connection to the trunk circuit from a calling subscriber and through the trunk circuit to the called subscriber, the trunk circuit controls the recording of called subscriber information in the trunk recorder. Thereafter, a common clock and calendar circuit is placed in operation by the trunk circuit, preferably in response to the receipt of answering supervisory signals, to store the date and time of filing the toll call in the trunk recorder.

To provide for the automatic identification of the calling subscriber, following the storage of the date and time information in the trunk recorder, the trunk circuit places an identifier sender allotter in operation so that the trunk finder switch individually associated with an idle one of a plurality of identifier senders associates the identifier sender with the trunk circuit. The input to the seized identifier sender is also cut through to the output of a common identifier circuit including signal amplifying and detecting components under the control of the allotter. At the completion of the association of the identifier sender with both the trunk circuit and the common identifier circuit, the trunk circuit supplies an identification signal over one of the leads of the extended connection to an identification matrix forming a portion of the common automatic calling line identification equipment. The energized conductor of the line circuit individual to the calling subscriber is interconnected with the identification matrix in such a manner that a group of matrix output conductors equal in number to the number of digits forming the designation of the calling subscriber is energized in accordance with the values of the digits forming the calling line designation.

These output conductors extend to the input of the common identifier circuit so that the incoming signals are amplified and detected therein to selectively operate output relays representing the values of the digits forming the designation of the calling subscriber. The operation of these output relays provides coded signals representing the calling line digits and these signals operate corresponding digit registers in the seized identifier sender. Following the completion of the storage of this information in the code registers in the seized identifier sender, the identification potential is removed from the extended switch train, and the identification matrix, the identifier sender allotter, identifier circuit, which form the common portion of the automatic calling line identification equipment, are released to permit their use in identifying other calling subscribers.

To record the registered calling line designation in the trunk recorder, the seized identifier sender, upon completion of the storage of the necessary digital information therein, initiates the transmission of a series of information and control pulses from the identifier sender to the trunk recorder in accordance with the values of the registered digits. Following the completion of the transmission of these items of information from the identifier sender to the trunk recorder, the identifier sender is released and the trunk circuit supplies the trunk recorder with information relating to the duration of the connection. In response to the release of the connection, the trunk circuit records an end of call signal in the trunk recorder to signify that all of the items of information pertaining to a toll call have been recorded. If desired, the trunk recorder may be capable of storing items of information pertaining to a plurality of toll calls subsequently placed through the trunk circuit with which the trunk recorder is individually associated.

To provide permanent records or statements of charges for the calling subscribers, the items of information stored in the trunk recorder are subsequently played back or transmitted to registering and recording components. During these playback operations, the items of information registered in the trunk recorder are removed by erasing the magnetic tape therein, thereby conditioning the trunk recorder for the storage of items of information pertaining to additional toll calls.

Many other objects and advantages of the present invention will become apparent from the following description of an illustrative embodiment thereof in the course of which reference is had to the accompanying drawings in which:

FIGS. 1 and 2 form a schematic diagram of certain components of an automatic toll ticketing system embodying the present invention, which system is shown in conjunction with a conventional automatic telephone system;

FIGS. 3, 4 and 5 form a schematic diagram of an identifier circuit;

FIGS. 6 to 10, inclusive, form a schematic diagram illustrating the details of an identifier sender circuit;

In general, the system of the present invention includes an automatic telephone system which is operative to provide telephonic communication in a conventional manner between local subscribers. On these local calls the automatic total ticketing facilities which are included in the system are not operative to register and record data. When the telephone system is used to provide telephonic communications between a local subscriber and a subscriber located in a remote area, the automatic toll ticketing facilities are utilized to collect and store the items of information pertaining to the calls to permit this information to be used in preparing a statement of charges for the subscribers.

Figure 1:
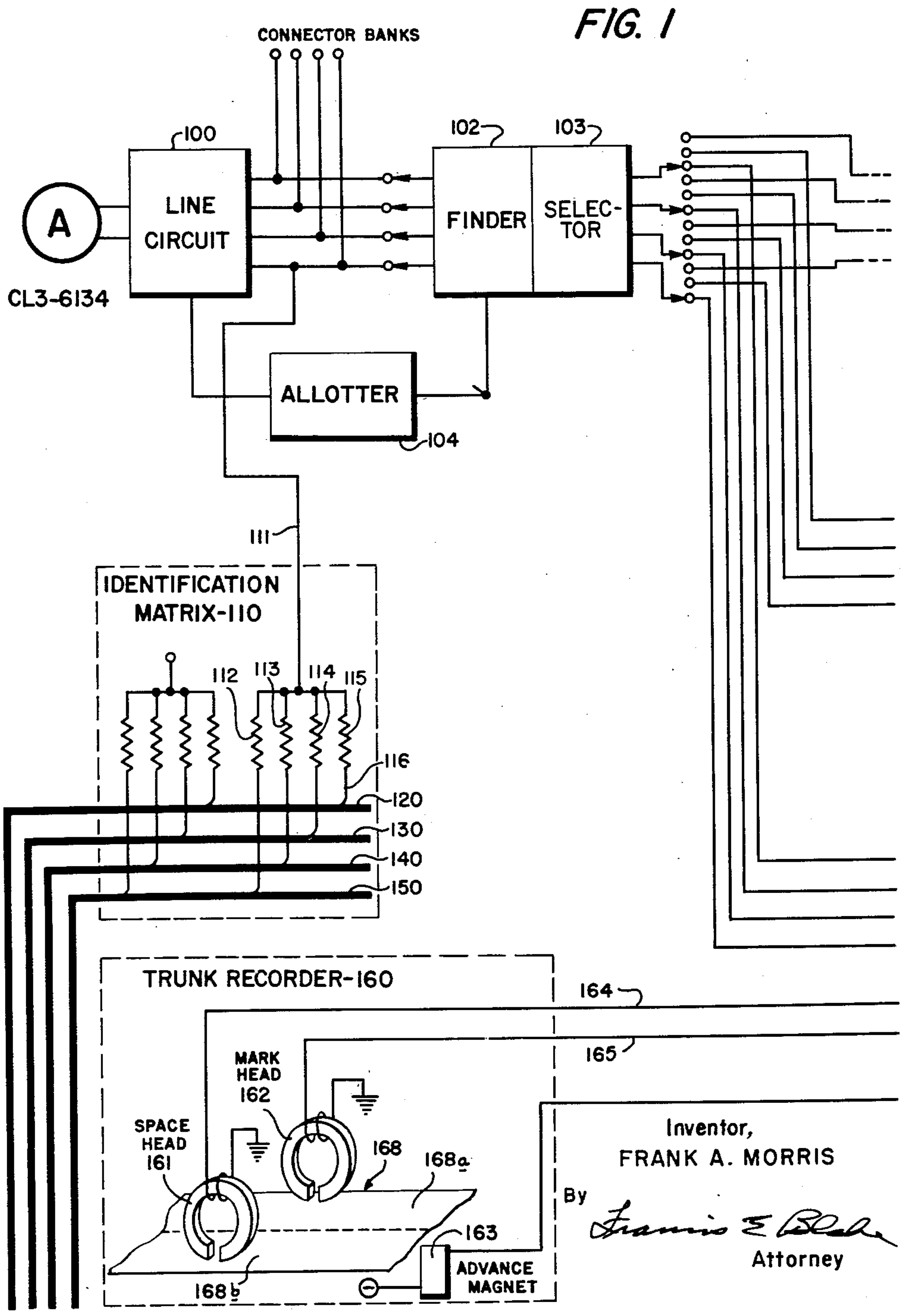
Figure 2:
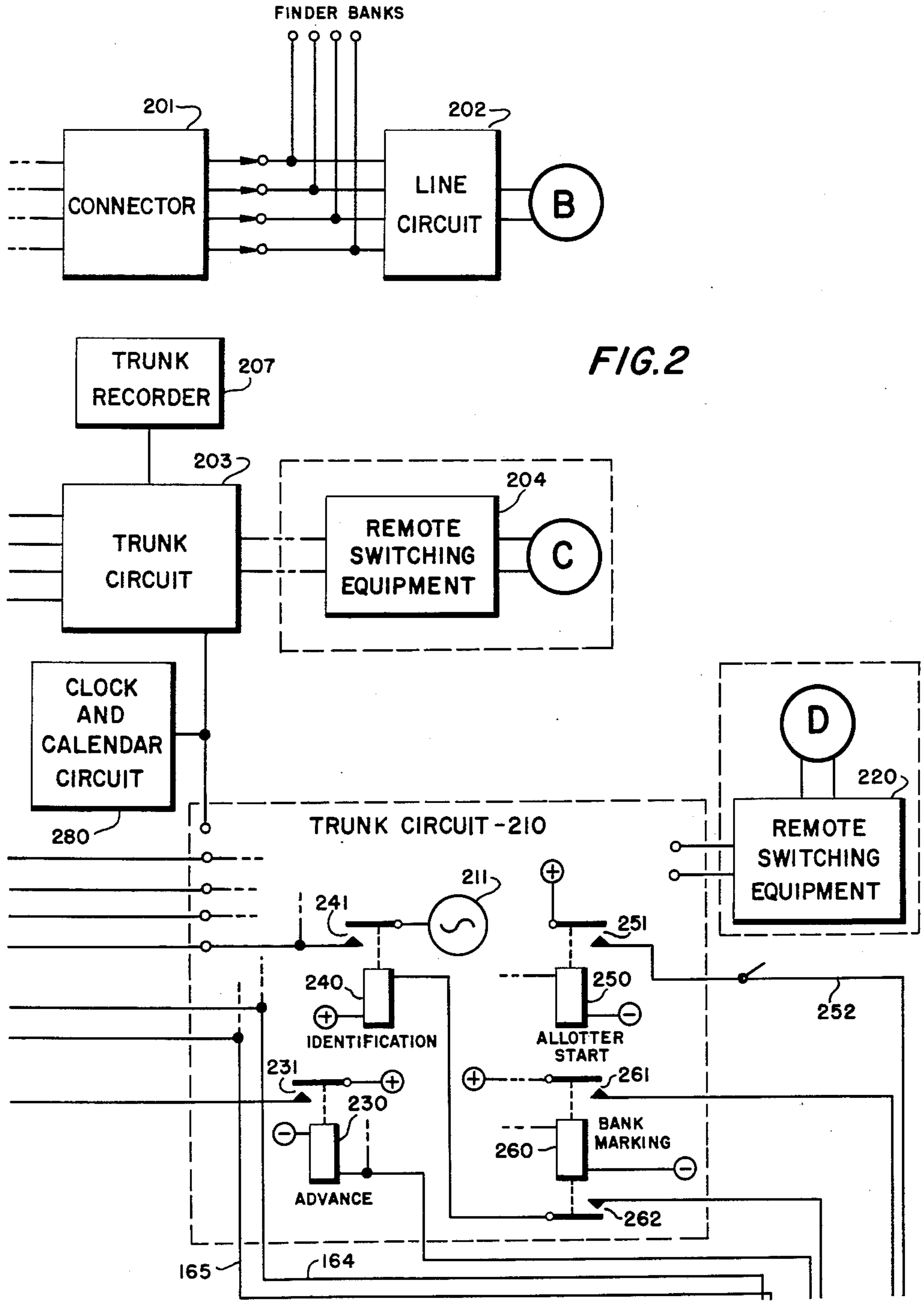

Referring now to FIGS. 1 and 2 of the drawings, in extending a call from a local subscriber A, which, for example, is assumed to have the directory number Clearbrook 3–6134 (CL 3–6134), to another local subscriber B, the conventional units of an automatic telephone system are utilized. More specifically, when the subscriber at the calling substation A removes the handset from the switch hook, thereby cutting through the calling line to a line circuit 100, an allotter 104 is placed in operation to search for and seize an idle link, such as a link including a line finder 102 and a selector 103. In response to seizure, the line finder 102 operates the switching means individual thereto so that the wipers thereof search for and seize the marked terminals of the line circuit 100 in which is terminated the line extending to the calling substation A. In response to finding the calling line circuit 100, dial tone is returned to the subscriber at the substation A to indicate that the dialing of the digits designating the called substation B may be initiated.

In response to the dialing of all or some of the digits designating the called substation B, the selector 103 and, perhaps, similar selectors, which may be interposed between the selector 103 and a connector 201, are operated in conjunction with the connector 201 to establish a connection through a line circuit 202 to the called substation B. The call is terminated by the release of the connection at either the calling substation A or the called substation B or by the release of the last of these two substations so as to restore the components 100, 102, 103, 201 and 202 to their normal condition. During this local call, the automatic toll ticketing facilities remain idle.

However, when a remote subscriber, such as a substation C in a remote area accessible through switching means 204 or a substation D in another remote area accessible through switching means 220 are called from the substation A, the toll ticketing facilities are placed in use by the selective seizure of one of a pair of trunk circuits 203 or 210 having individually associated trunk recorders 160 and 207. The trunk circuit 210 controls the recording of data in the trunk recorder 160 relating to calls placed to subscribers in the area in which the substation D is located, and the trunk circuit 203 controls the recording of data in the trunk recorder 207 relating to calls extended to subscribers in the area in which the substation C is located.

More specifically, assuming that a call is to be extended from the substation A to the substation D in a remote area, the allotter 104, the line circuit 100, the line finder 102, and the selector 103 operate as described above to extend the connection from the calling substation A to an idle link, such as the link including the components 102 and 103, and thereafter to return dial tone to the substation A to indicate that the extension of the connection can be initiated under the control of dialed digits. Since the call is to be extended to the substation D, a first or access digit is dialed at the substation A to advance the wipers of the switching means in the first selector 103 to the level of contacts to which are connected the trunks extending to the desired remote area. This access digit is different in value from the access digit which must be dialed to secure access to the trunk circuits extending to the remote area in which the called substation C is located. Following the dialing of this digit, the wipers automatically advance over the contacts in the selected level to search for and seize an idle trunk circuit, and, assuming that the trunk circuit 210 is idle, the selector 103 cuts through the calling loop circuit to the trunk circuit 210. In seizing the trunk circuit 210, this comonent is prepared for controlling the recording of the data pertaining to the toll call between the substations A and D in the individually associated trunk recorder 160.

The trunk recorders 160 and 207 provide means for temporarily registering the items of information pertaining to the calls extended through the trunk circuits 210 and 203, respectively, and also means for subsequently transmitting this data to recording facilities at selected times. Although the trunk recorders may be of any of the many types well known in the art, they preferably are of the type disclosed in United States Patent No. 2,867,435 to Howard S. Gleason.

As shown in the Gleason patent, each of the recorders comprises a baseplate on which is detachably mounted a magazine containing an endless loop of magnetic tape such as 168 (FIG. 1), which is stored in random layer fashion. A portion of the magnetic tape 168 which is disposed outside of the magazine is moved relative to a pair of transducing heads 161 and 162 by a tape advancing means controlled by an advance magnet 163. The transducing heads 161 and 162 include two magnetic gaps which are disposed adjacent contiguous portions of the magnetic tape 168 to define a mark pulse channel **168*a* and a space pulse channel 168*b* for receiving mark and space pulse information. The mark pulses recorded on the channel 168*a*** represent the values of the digits stored in the trunk recorder 160, whereas the space pulses recorded on the channel 168*b* generally are utilized for control operations. During recording operations, the magnetic tape 168 is stationary, and the advancing means controlled by the advance magnet 163 comprises a pawl and ratchet driving arrangement for advancing the magnetic tape 168 through a very small distance following the recording of each pulse. In addition to the components schematically indicated in FIG. 1 of the drawings, the trunk recorder 160 may include an erasing head for removing the pulse information recorded on the tape 168, an additional driving mechanism for advancing the magnetic tape 168 at high speeds during playback or reproducing operations, and a contacting arrangement controlled by perforations or conductive foil portions in the tape 168 which define the effective beginning and end thereof.

The trunk circuits 203 and 210 may be of the general type disclosed in the above identified Morris et al. patent or may be of the type shown in the copending application of F. A. Morris, M. A. Clement and B. A. Harris, Serial No. 536,571, filed September 26, 1955, which application is assigned to the same assignee as the present application. As described above and in the copending application and Morris et al. patent, in response to the extension of the connection from the calling substation A to the trunk circuit 210, the trunk circuit repeats the dialed digits through to the remote switching equipment 220 to control the establishment of a connection to the called substation D. Simultaneously therewith, the dialed digits are repeated to the trunk recorder 160 to be recorded therein so that the digits comprising the directory number of the called substation D form the first item of information pertaining to the toll call which is stored in the trunk recorder 160. The digital information is stored in the trunk recorder 160 by periodically energizing the mark pulse head 162 to record a number of pulses on the mark pulse channel 168*a* which is equal to the value of the digit to be registered, the group of mark pulses representing each digit being followed by a space pulse which is recorded on the space pulse channel 168*b* of the magnetic tape 168 by the momentary energization of the space pulse head 161 under the control of the trunk circuit 210. The advance magnet is energized following the recording of each mark or space pulse on the tape 168 to advance the medium to the next recording portion. Accordingly, following the dialing of the digits necessary to complete the extension of the connection through the trunk circuit 210 and the remote switching equipment 220 to the called substation D, the digits forming the directory number of the called substation D have been recorded on the magnetic tape 168 of the trunk recorder 160 to provide the first registered item of information.

In order to provide a record of the date and time of extending the toll call between the substations A and D, the receipt of answering supervisory signals from the remote switching equipment 210 operates control circuits in the trunk circuit 210 to place a common clock and calendar circuit 280 in operation to transmit a series of groups of mark pulses followed by space pulses to the heads 161 and 162 in the trunk recorder 160 representing the day and month of the date and the hours and minutes of the time at which the toll call between the substations A and D is completed. Although the clock and calendar circuit 280 is shown in FIG. 2 of the drawings in block form, this circuit may be of the type disclosed in the copending application of B. A. Harris, Serial No. 536,577, filed September 26, 1955, now Patent No. 2,947,817.

Figure 3:
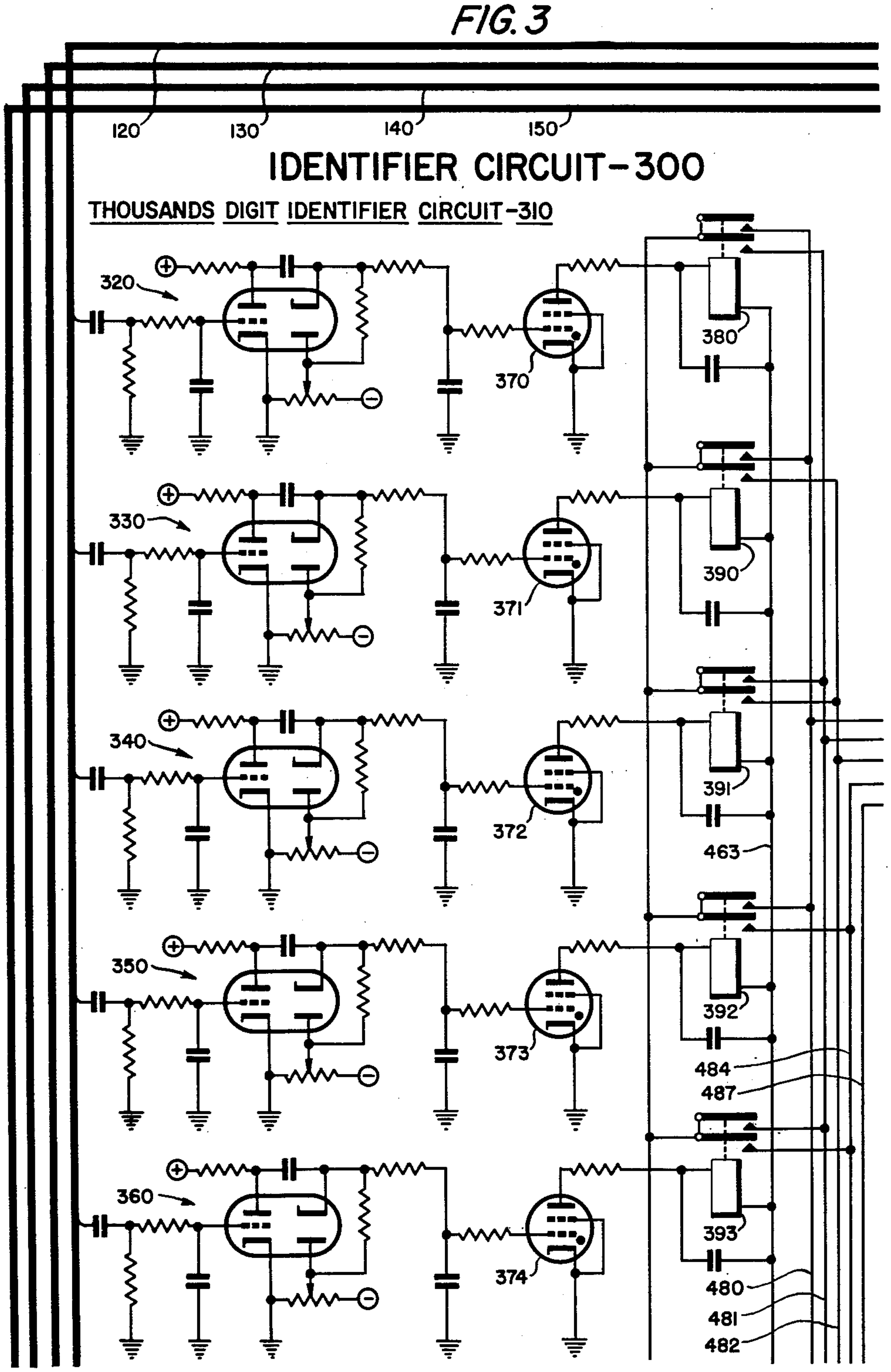
Figure 4:
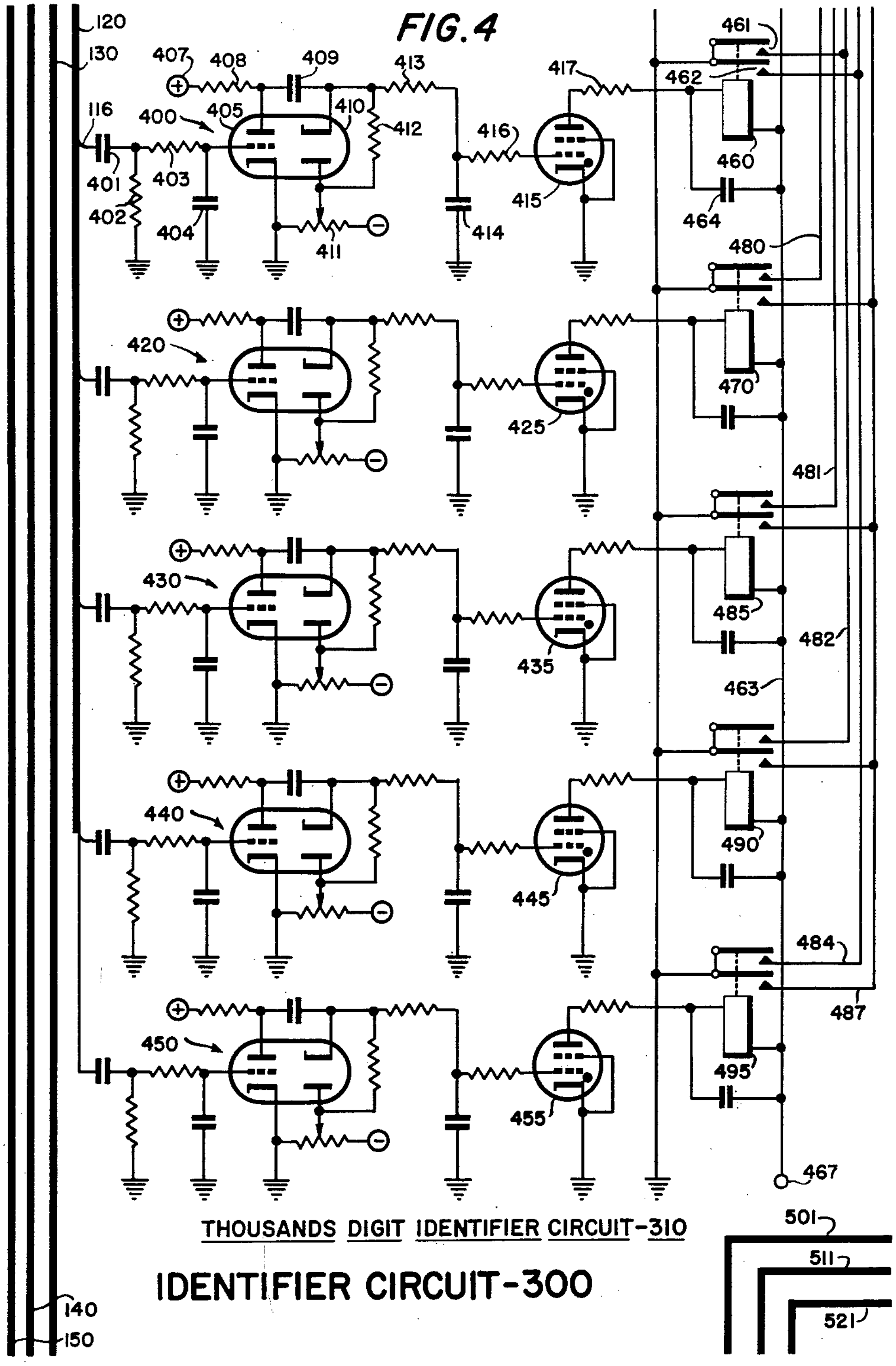
Figure 5:
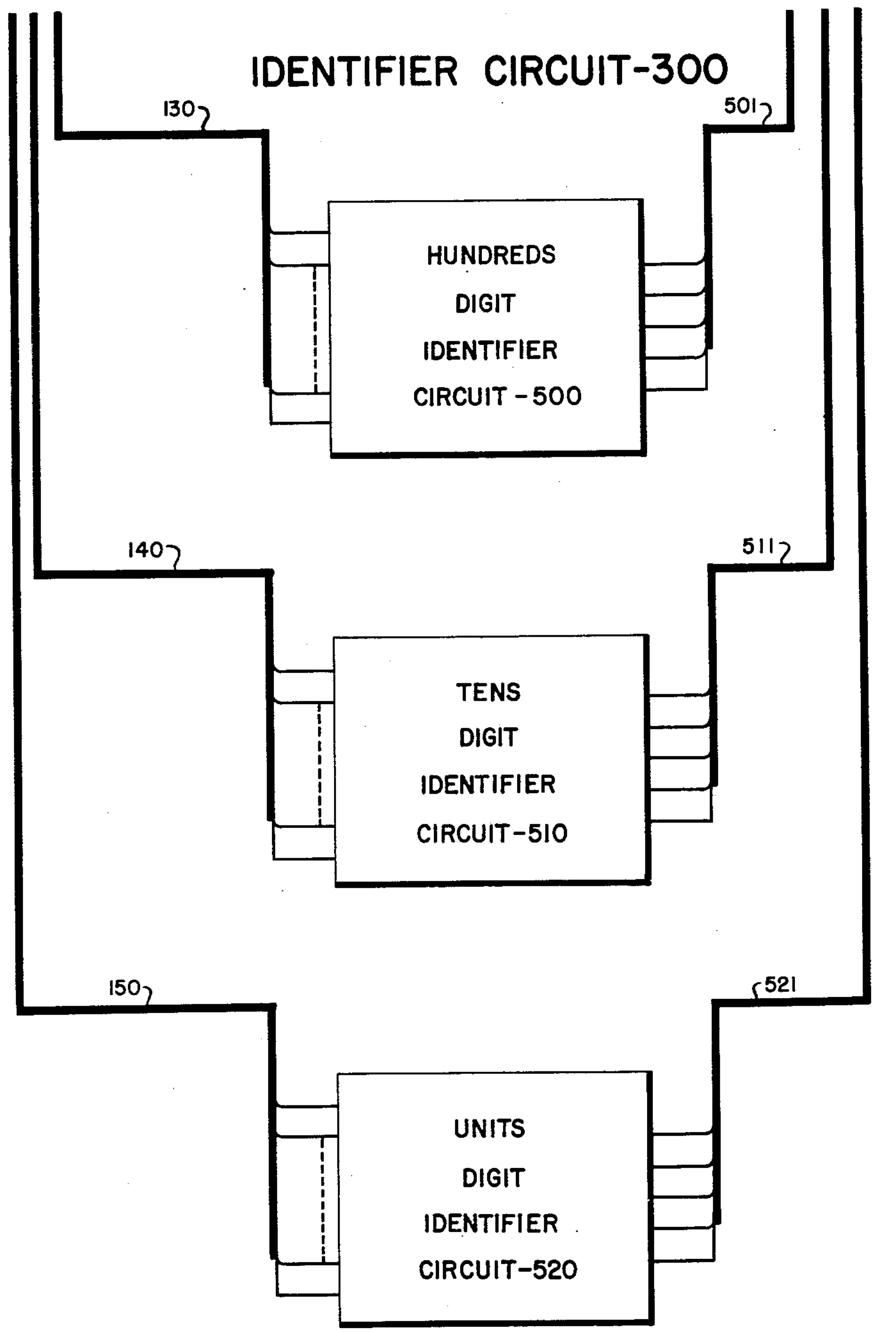
Figure 6:
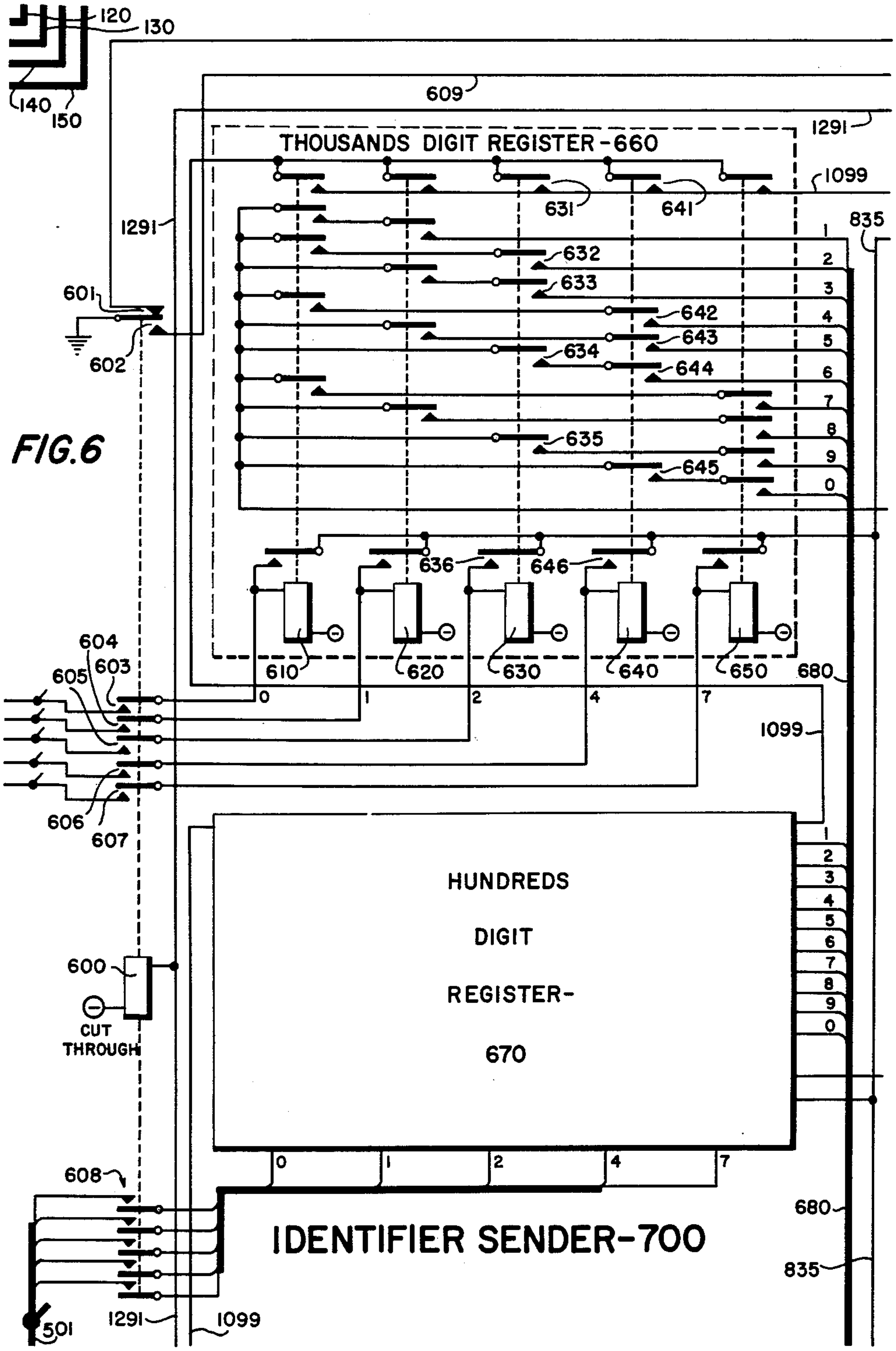
Figure 7:
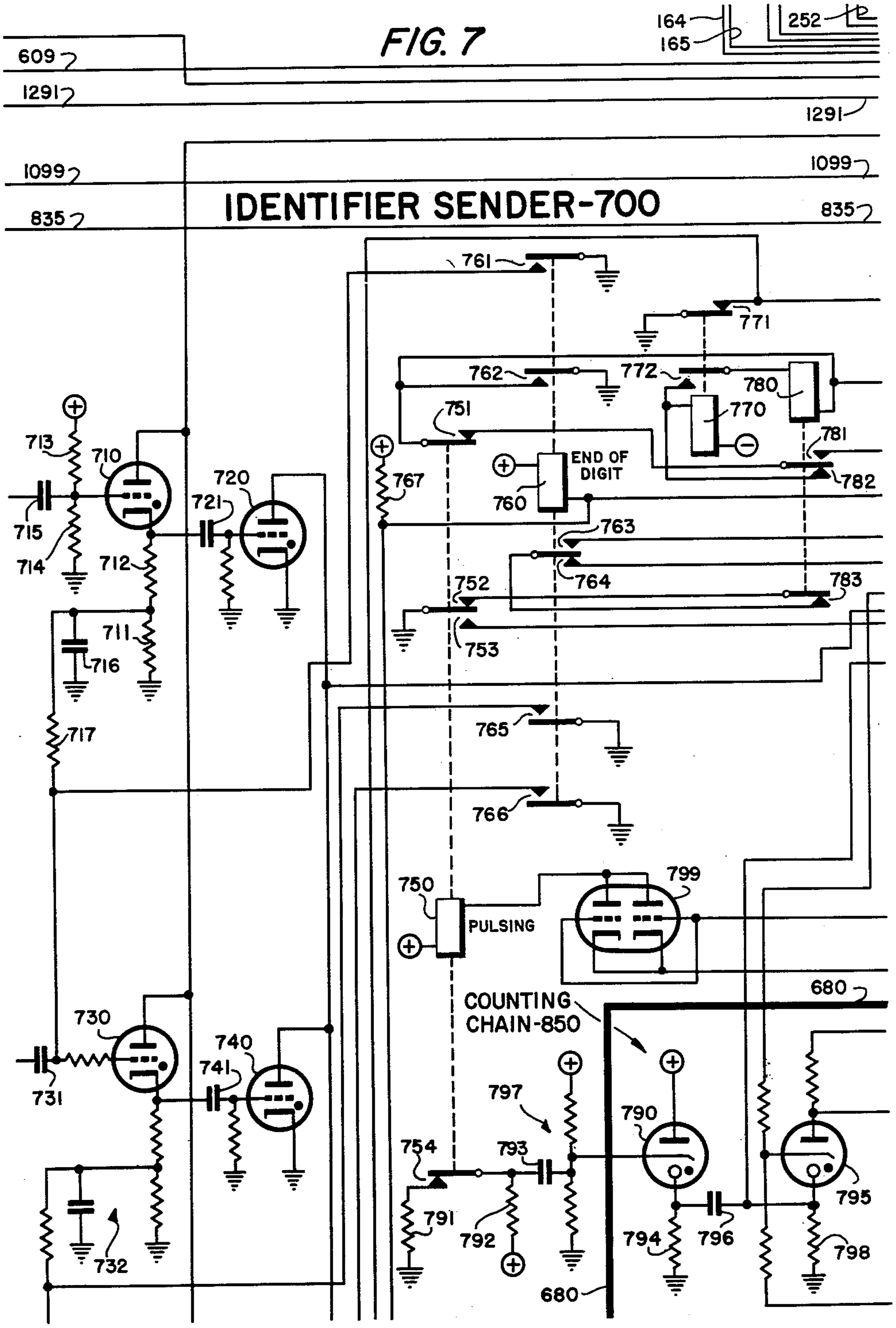
Figure 8:
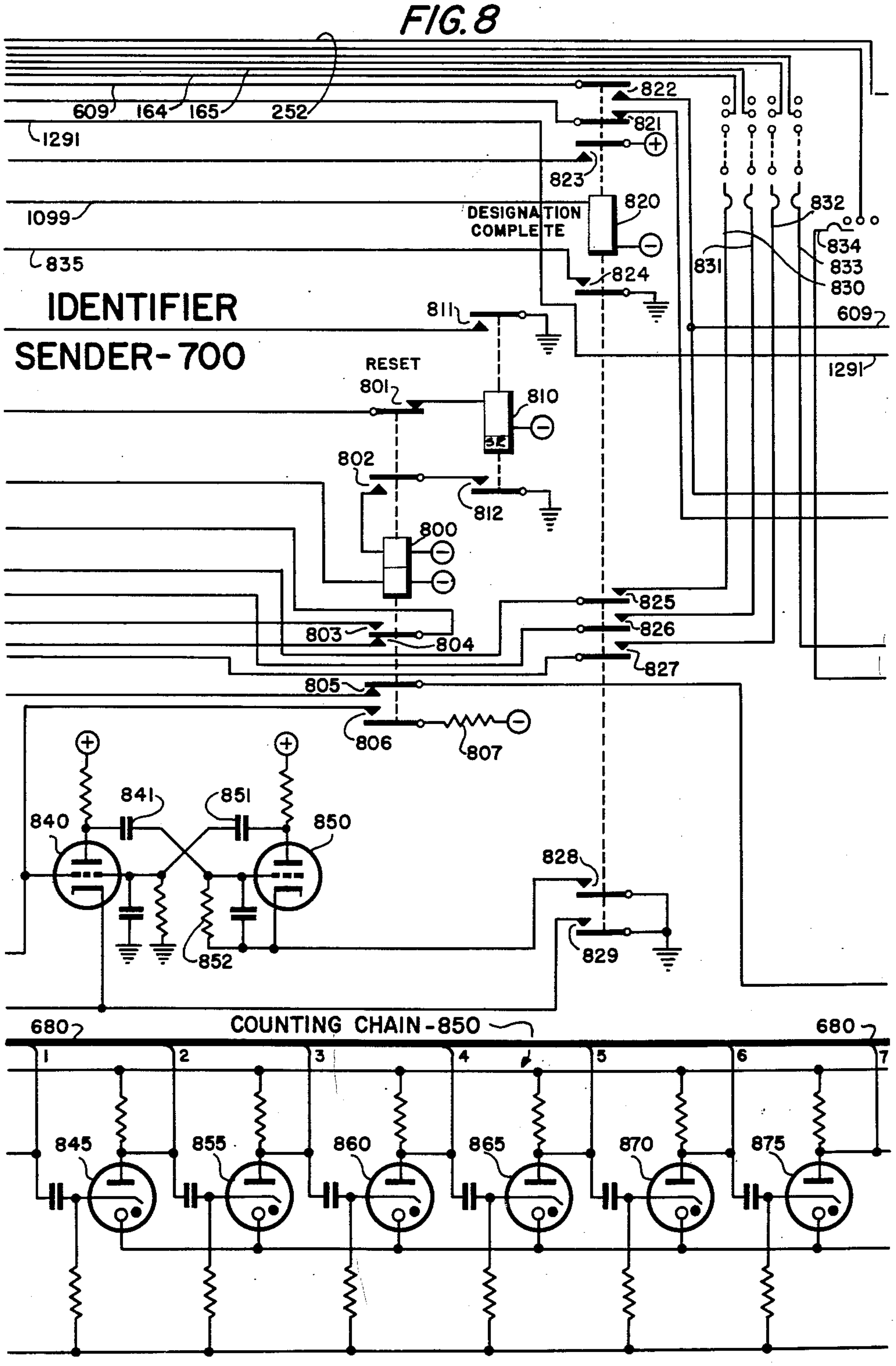
Figure 9:
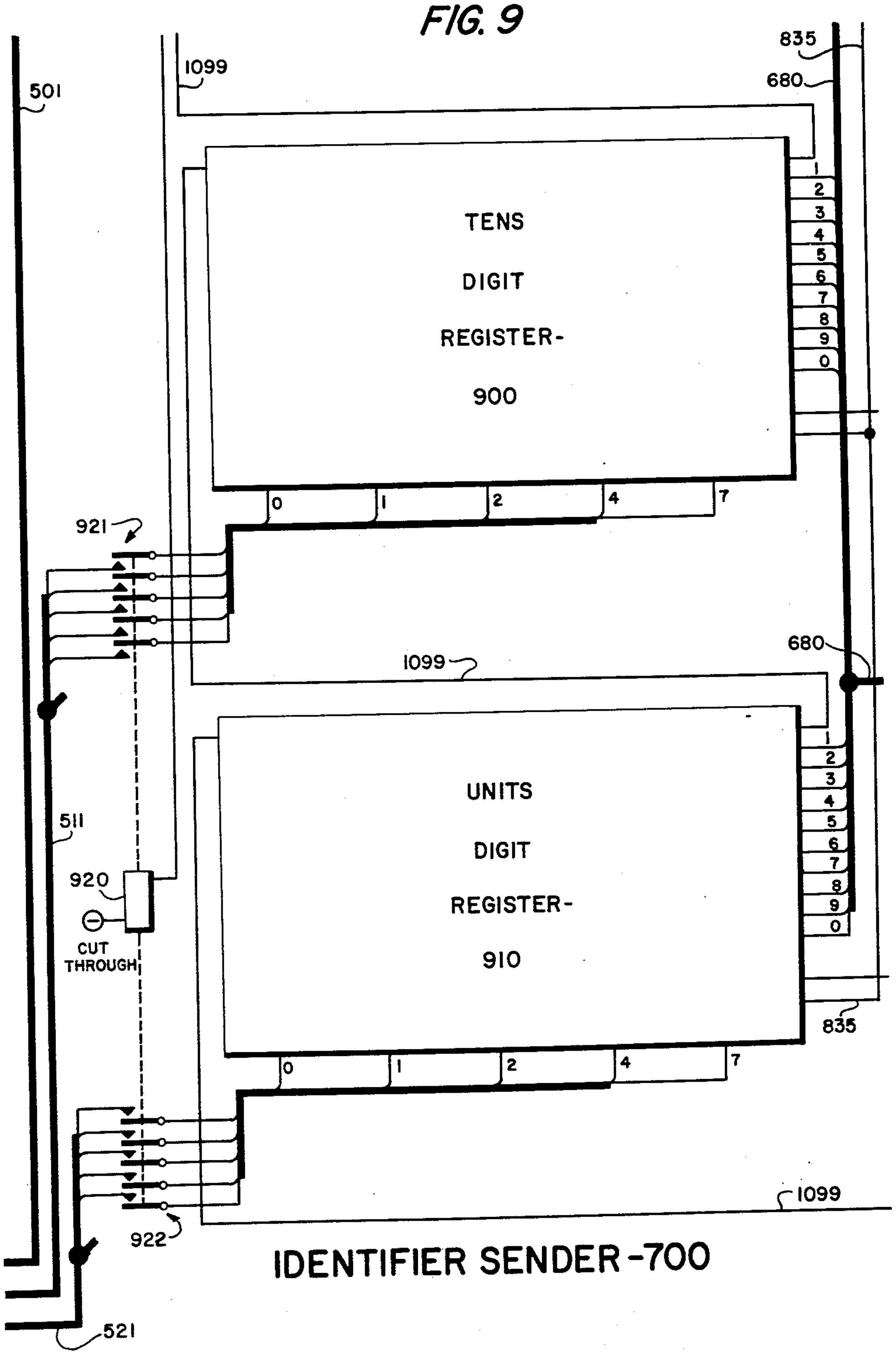
Figures 10, 13:
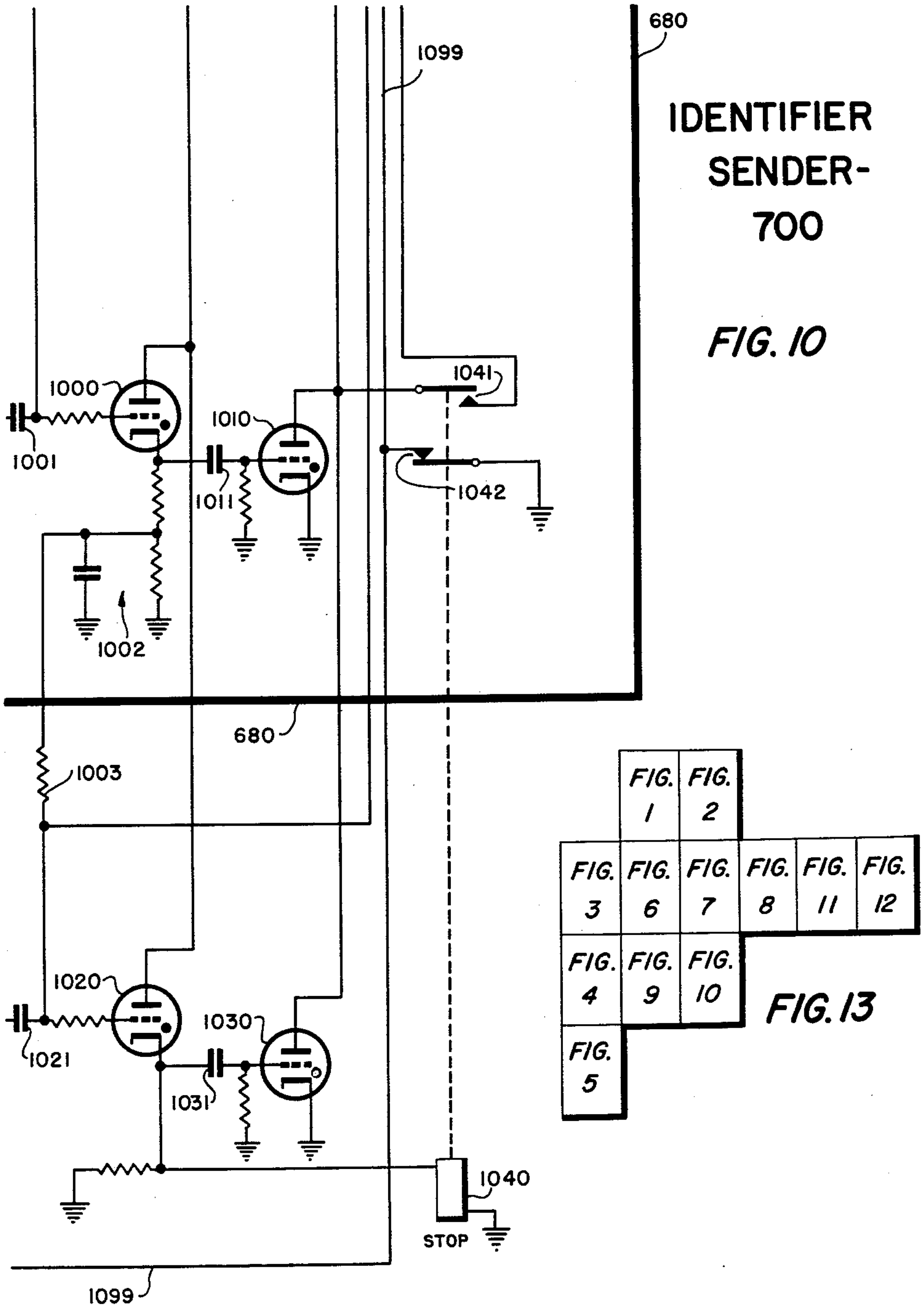
FIG. 13 is a block diagram disclosing the manner in which FIGS. 1 to 12, inclusive, are positioned adjacent each other to form a complete circuit diagram of an automatic toll ticketing system forming an embodiment of the present invention.
Figure 11:
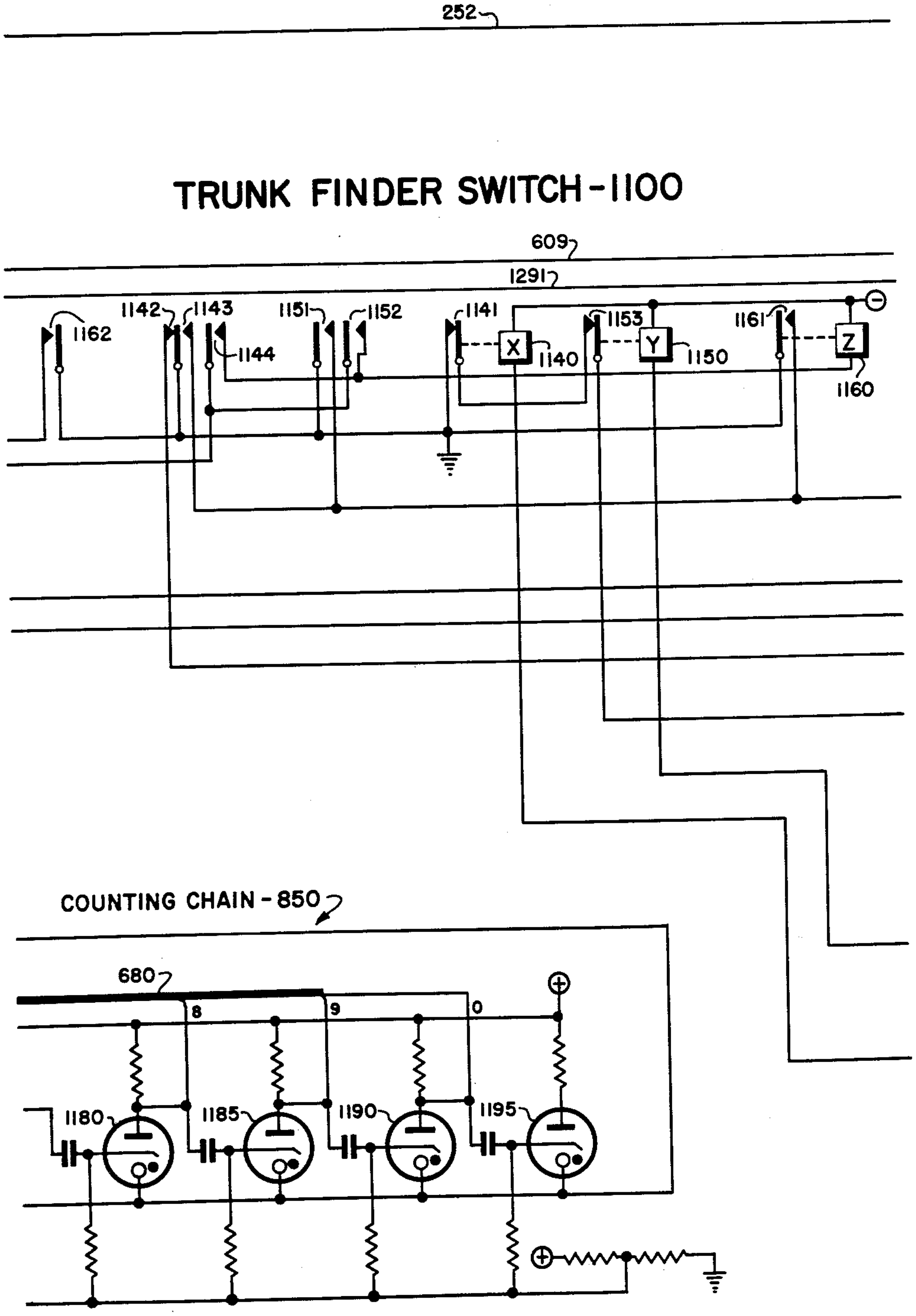
FIG. 11 is a schematic drawing illustrating a trunk finder switch which is individually associated with the identifier sender circuit shown in FIGS. 6 to 10 inclusive.
Figure 12:
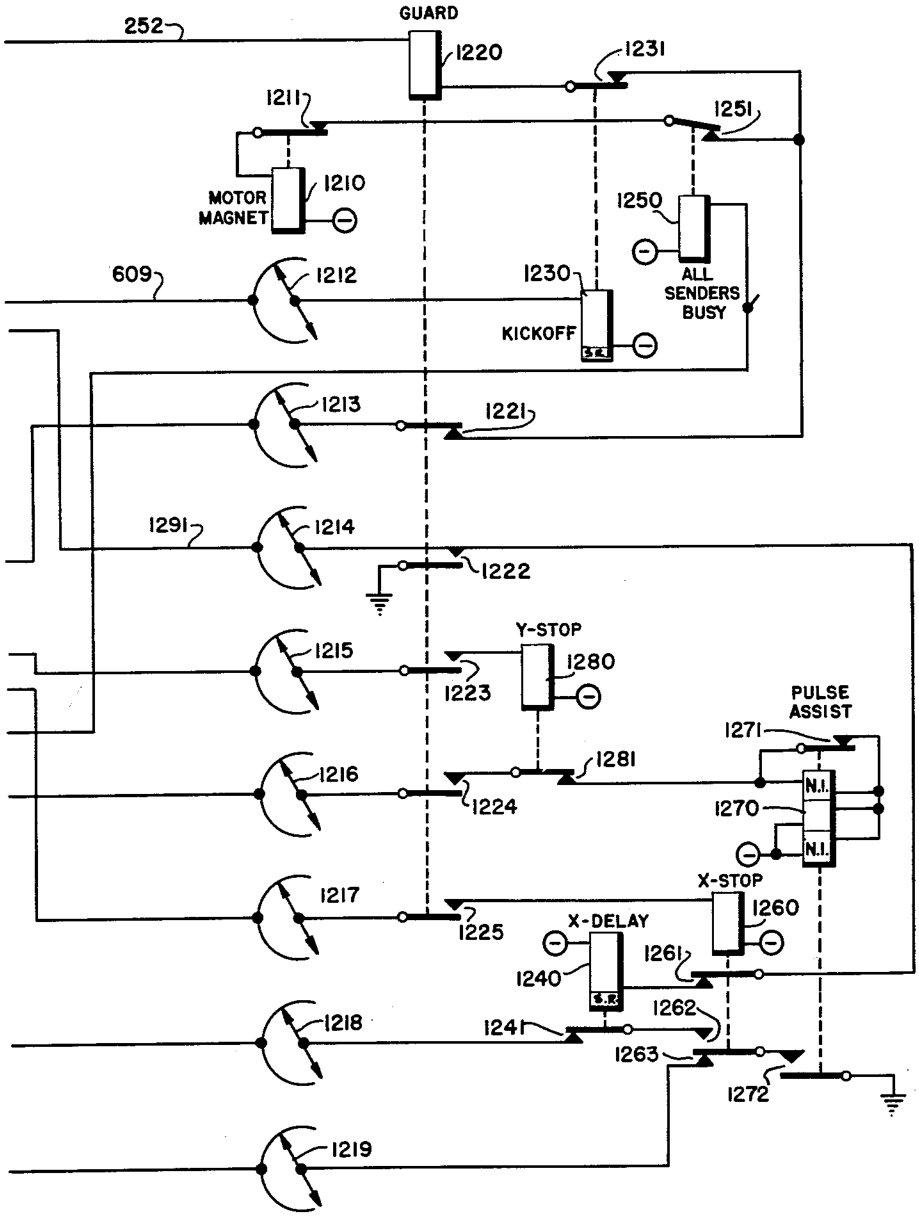
FIG. 12 illustrates the details of an identifier sender allotter.

Following the completion of the transmission of the date and time information from the clock and calendar circuit 280 through the trunk circuit 210 to the trunk recorder 160, the identification of the calling substation is initiated. The calling subscriber identifying equipment includes an identification matrix 110 (FIG. 1) and an identifier circuit 300 (FIGS. 3–5) which are common to all of the lines in a given area or office and which are momentarily associated with a calling line circuit to provide signals representing the digits forming the designation of the calling substation. A plurality of identifier senders, such as an identifier sender 700 (FIGS. 6–10), are provided in the identifying means, and one of the identifier senders is associated with the trunk circuit 210 and with the common identifier circuit 300 by a trunk finder switch, such as the switch 1100 (FIG. 11), which is operated by an identifier sender allotter 1200 (FIG. 12). The seized and associated identifier sender 700 receives and stores the digits of the designation of the calling substation in accordance with the signals provided by the circuit 300. Following the storage of the calling station designation in an identifier sender, the identifier circuit 300 and the identification matrix 110 are released for use in identifying the calling substations involved in subsequently placed calls. Thereafter, the identifier sender, such as the unit 700 transmits a series of mark and space pulses, together with advance pulses, to the trunk circuit 210 and the trunk recorder 160 to store the designation of the calling substation in the trunk recorder 160. Since a plurality of identifier senders similar to the identifier sender 700 are provided, the identification matrix 110 and the identifier circuit 300 can be immediately released and utilized to establish subsequent calling substation identifications in other of the identifier senders during the time interval in which the identifier sender 700 is transmitting the digital information stored therein to the trunk recorder 160.

*Identifier Sender Allotter 1200 and Trunk Finder Switch 1100*

As set forth above, the identifier sender allotter 1200 operates the trunk finder switch 1100 to associate an idle one of a plurality of identifier senders, such as the sender 700, with the trunk circuit 210 and also associates this sender with the common identifier circuit 300 so that items of information representing the designation of the calling substation A are stored in the sender 700. The allotter 1200 further serves to release the identifier circuit 300 and to initiate operation of the sender 700 to transmit the registered information therein to the trunk recorder 160.

As set forth above, the identification operation is preferably initiated in response to the completion of the storage of the date and time information, at which time, relays 250 and 260 in the trunk circuit 210 are operated. Operation of the bank marking relay 260 closes a plurality of contacts 261 and 262. The closure of the contacts 261 forwards ground to the contact banks of all of the trunk finder switches, such as the trunk finder switch 1100, to mark the level of the contact banks in which are terminated the conductors extending from the trunk circuit 210. The closure of the contacts 262 interconnects the grounded operating winding of an identification relay 240 in the trunk circuit 210 with one of the bare wire multiples in the contact level marked by the closed contacts 261, thereby to indicate the position in the selected contact level which is occupied by the calling trunk circuit 210.

Simultaneously with operating the bank marking relay 260, the allotter start relay 250 is operated to close a pair of contacts 251. The closure of the contacts 251 applies ground to a common allotter start conductor 252, which extends between the identifier sender allotter 1200 and all of the trunk circuits to which the identifier sender allotter 1200 is common, so as to place the allotter 1200 in operation. Accordingly, in response to the completion of the storage of the date and time information, the trunk circuit 210 operates to mark the trunk circuit 210 as being the trunk circuit with which an idle identifier sender is to be associated and further extends start ground to the identifier sender allotter 1200 so that the trunk finder switch of an idle identifier sender, such as the switch 1100 of the identifier sender 700, is placed in operation to associate an identifier sender with the calling trunk circuit 210.

The application of ground to the common allotter start conductor 252 places the identifier sender allotter 1200 in operation by completing an operating circuit for a guard relay 1220 therein, this operating circuit extending through a plurality of normally closed contacts 1231, 1251, and 1211 and the operating winding of a motor magnet 1210 to grounded battery. The contacts 1251 in the above identified operating circuit for the guard relay 1220 are normally maintained closed inasmuch as an all-senders-busy relay 1250 is maintained operated so long as one or more of the identifier senders to which the allotter 1200 has access is in an idle condition. Assuming that the identifier sender 700 is idle, as represented by the trunk finder switch 1100 associated therewith being in its normal or home position, a pair of X off normal contacts 1142 forming a portion of the switch 1100 are in a normally closed condition so that ground is supplied directly to the operating winding of the all-senders-busy relay 1250. Similar parallel circuits extending to the X off normal contacts of all of the other trunk finder switches to which the allotter 1200 has access maintains the all-senders-busy relay 1250 operated for so long as there are any idle identifier senders associated with the identifier sender allotter 1200. In the event that all of the senders are engaged in calling line identification operations, ground is removed from the all-senders-busy relay 1250 so that this relay releases to open the contacts 1251. The opening of these contacts interrupts the above described operating circuit for the guard relay 1220, thereby to prevent the association of an idle identifier sender with the calling trunk circuit 210. However, the trunk circuit 210 maintains ground on the allotter start conductor 252 until such time as one of the identifier senders is released and returned to a normal condition in which it is capable of then being associated with the trunk circuit 210.

As described above, the application of ground to the start conductor 252 completes an operating circuit for the guard relay 1220 which includes the operating winding of the motor magnet 1210. However, the motor magnet 1210 is not energized sufficiently to operate by the completion of this circuit and, accordingly, a plurality of wipers 1212 to 1219, inclusive, controlled by the magnet 1210 are not conditioned for movement. On the other hand, the guard relay 1220 is adequately energized and operates to open a pair of contacts 1221 and to close a plurality of contacts 1222, 1223, 1224, and 1225. The opening of the contacts 1221 interrupts a point in an open operating circuit for the motor magnet 1210 to prevent the allotter from being advanced.

Assuming that the identifier sender 700 is idle and that the plurality of wipers 1212 to 1219, inclusive, are in engagement with the contacts to which are connected the conductors individual to the identifier sender 700 and its associated trunk finder switch 1100, the closure of the contacts 1222 applies ground over the wiper 1214 and a conductor 1291 to complete the operating circuit for a pair of cut-through relays 600 and 920 in the identifier sender 700. The operation of these two relays opens a pair of contacts 601 and closes a plurality of contacts 602 to 607, inclusive, a group of contacts 608, a group of contacts 921, and a group of contacts 922. The opening of the contacts 601 interrupts a point in an operating circuit for a reset magnet 1160 of the trunk finder switch 1100. The closure of the contacts 602 applies ground to a conductor 609 to prepare an operating circuit for a kickoff relay 1230 in the allotter 1200, which circuit is open at the contacts 822. The closure of the contacts 603 to 607, inclusive, interconnects a group of register relays in a thousands digit register 660 in the identifier sender 700 with the output of a thousands digit identifier circuit 310 in the identifier circuit 300. The closure of the group of contacts 608 interconnects the register relays in a hundreds digit register 670 with the output from a hundreds digit identifier circuit 500 in the identifier circuit 300. In a similar manner, the closure of the groups of contacts 921 and 922 interconnect the register relays in a tens digit register 900 and a units digit register 910 in the identifier sender 700 with the output of a tens digit identifier circuit 510 and a units digit identifier circuit 520 in the identifier circuit 300. Accordingly, the operation of the guard relay 1220 incident to placing the allotter circuit 1200 in operation cuts through a connection between the idle identifier sender 700 and the common identifier circuit 300.

In addition, the above described closure of the contacts 1222 completes an obvious operating circuit extending through a pair of normally closed contacts 1261 for operating an "X" delay relay 1240. Operation of the "X" delay relay 1240 opens a pair of contacts 1241 to interrupt a point in an operating circuit for a Y magnet 1150 in the trunk finder switch 1100 extending over the wiper 1218.

In order to prepare the identifier sender allotter 1200 for controlling the stepping operation of the trunk finder switch 1100, which is individually associated with the idle and allotted identifier sender 700, the closure of the contacts 1223 in response to operation of the guard relay 1220 prepares an operating circuit for a "Y" stop relay 1280 which extends over the wiper 1215 to a wiper 833 of the trunk finder switch 1100. The closure of the contacts 1225 interconnects the operating winding of an "X" stop relay 1260 with a wiper 834 of the trunk finder switch 1100 through the wiper 1217.

To initiate stepping operation of the trunk finder switch 1100 to search for the trunk circuit 210, the closure of the contacts 1224 completes an operating circuit for a pulse assist relay 1270 which extends from ground through a pair of normally closed interrupter contacts 1141 controlled by an X motor magnet 1140 of the trunk finder switch 1100, a pair of normally closed interrupter contacts 1153 controlled by the Y motor magnet 1150, the wiper 1216, the closed contacts 1224, a pair of closed contacts 1281, a pair of interrupter contacts 1271 controlled by the pulse assist relay 1270, and thence to grounded battery through the lowermost two of the windings on the pulse assist relay 1270. Operation of this relay closes a pair of contacts 1272 and opens the contacts 1271. Opening the contacts 1271 removes the shunt around the uppermost of the windings of the pulse assist relay 1270 to place this noninductive winding in series with the other windings on the relay 1270 to reduce the current flow through the relay.

The closure of the contacts 1272 completes an operating circuit for the X motor magnet 1140 extending through a pair of normally closed contacts 1263 and the wiper 1219. Operation of the motor magnet 1140 advances a plurality of wipers 830, 831, 832, 833, and 834 controlled thereby a single step in an X direction and also opens the pair of interrupter contacts 1141. Opening the interrupter contacts 1141 interrupts the above described operating circuit for the pulse assist relay 1270 so that this relay releases to close the contacts 1271 and to open the contacts 1272. The closure of the contacts 1271 prepares the above described operating circuit for the pulse assist relay 1270, and the opening of the contacts 1272 interrupts the above described operating circuit for the X motor magnet 1140 so that this magnet releases to again close the contacts 1141, thus terminating the first step of movement of the wipers of the trunk finder switch 1100 in an X direction.

Incident to movement of the wipers 830 to 834, inclusive, a single step in an X direction, an X off normal contact arrangement is operated so that the contacts 1142 are opened and a plurality of contacts 1143 and 1144 are closed. The opening of the contacts 1142 removes the above described source of ground from the operating winding of the all-senders-busy relay 1250. However, this relay does not release unless all of the other senders to which the allotter 1200 has access are also busy. The closure of the off normal contacts 1143 prepares an operating circuit for the motor magnet 1210, which, however, is interrupted at the open contacts 1221. The closure of the contacts 1144 prepares an operating circuit for the reset magnet 1160 of the trunk finder switch 1100, but this circuit is interrupted due to the prior opening of the contacts 601.

As described above, the release of the X motor magnet 1140 to close the interrupter contacts 1141 again completes the operating circuit for the pulse assist relay 1270 so that this relay operates to again operate the X motor magnet 1140 and thereby to advance the wipers 830 to 834, inclusive, a single additional step in the X direction. This intermittent operation and release of the pulse assist relay 1270 and the X motor magnet 1140 continues until such time as the wiper 834, which moves in only the X direction, is moved into engagement with the contact in the contact bank associated therewith which represents the contact level to which the trunk circuit 210 is assigned. At this time, the ground provided at the closed contacts 261 is extended over the wiper 1217 and through the closed contacts 1225 to complete an obvious operating circuit for the "X" stop relay 1260.

The operation of this relay opens the contacts 1261 and 1263 and closes a pair of contacts 1262. The opening of the contacts 1263 interrupts the pulsing path controlled by the contacts 1272 extending to the X motor magnet 1140, and the concurrent closure of the contacts 1262 transfers the pulsing path controlled by these contacts to an open operating circuit for the Y motor magnet 1150. The opening of the contacts 1261 interrupts the above described operating circuit for the "X" delay relay 1240 which, in being slow-to-release, releases after a predetermined time interval sufficient to assure that the plurality of wipers 830 to 834, inclusive, in the trunk finder switch 1100 have completed their last step of movement.

After this time delay, the "X" delay relay 1240 releases to close the contacts 1241, thereby to complete the pulsing path extending through the closed contacts 1262 and the wiper 1218 to the operating winding of the Y motor magnet 1150. The pulse assist relay 1270 again operates over the above described circuit to close the contacts 1272 to complete the above described operating circuit for the Y motor magnet 1150 which, in operating, opens the pair of contacts 1152 and advances the wipers 830 to 833, inclusive, a single step in a Y direction. Incident to moving a single step in a Y direction, a Y off normal contact arrangement is operated to close a plurality of contacts 1151 and 1152. The closure of the contacts 1151 prepares an additional point in the above described operating circuit for the motor magnet 1210. The closure of the contacts 1152 prepares an additional parallel operating circuit for the reset magnet 1160 of the trunk finder switch 1100 which, as described above, is interrupted at the open contacts 601. The opening of the interrupter contacts 1153 interrupts the operating circuit for the pulse assist relay 1270 so that this relay releases to open the contacts 1272 and, in doing so, interrupts the operating circuit for the Y motor magnet 1150 so that the contacts 1153 are again closed.

In this manner, the pulse assist relay 1270 and the Y motor magnet 1150 alternately operate and release to move the plurality of wipers 830 to 833, inclusive, in the Y direction. This intermittent movement continues until such time as the wiper 833 is moved into engagement with the bare wire multiple individual to the trunk circuit 210 and which is connected to the grounded operating winding of the identification relay 240 through the closed contacts 262. This movement of the wiper 833 operates an identification relay 240 in the trunk circuit 210 and the "Y" stop relay 1280 in the allotter 1200 by completing a series circuit including ground, the operating winding of the relay 240, the wiper 833, the wiper 1215, the closed contacts 1223, the operating winding of the "Y" stop relay 1280, and grounded battery. The operation of the "Y" stop relay 1280 opens the contacts 1281 to interrupt the above described operating circuit for the pulse assist relay 1270 so that intermittent operation thereof and, accordingly, of the Y motor magnet 1150 is terminated with the wipers 830, 831, 832, and 833 in engagement with the bare wire multiples which are individual to the trunk circuit 210.

The operation of the identification relay 240 initiates the application of the identification potential over the extended switch train to the identification matrix 110 and, accordingly, operates the identifier circuit 330 to provide coded signals to the identifier sender 700 representing the digits of the directory number of the calling substation A. The completion of the storage of this information in the identifier sender 700 initiates the release of the common identifier circuit 300 and the identification matrix 110 and also operates the identifier sender allotter 1200 to preselect another idle identifier sender for association with the next calling trunk circuit.

More specifically, the completion of the storage of the thousands, hundreds, tens, and units digits of the directory number of the calling substation A in the seized identifier sender 700 completes an operating circuit for a designation complete relay 820 so that this relay operates to close the contacts 822. The closure of these contacts extends ground from the closed and grounded contacts 602 over the conductor 609 and the wiper 1212 to complete an obvious operating circuit for a slow-to-release kickoff relay 1230. The operation of this relay opens a pair of contacts 1231 to release the guard relay 1220. In releasing, the guard relay 1220 closes the contacts 1221 and opens the contacts 1222, 1223, 1224, and 1225.

The opening of the contacts 1222 interrupts, at an additional point, the operating circuit for the "X" delay relay 1240 and also removes ground from the conductor 1291, thereby to open the operating circuits for the cut-through relays 600 and 920. The release of these two relays opens the interconnection between the digit registers in the identifier sender 700 and the output of the identifier circuit 300, thereby freeing the common identifier circuit for use in conjunction with the automatic identification of subsequently placed calls. The release of the cut-through relay 600 also closes the contacts 601 to prepare an operating circuit for the reset magnet 1160 of the trunk finder switch 1100. However, due to the prior operation of the designation complete relay 820, which results in the opening of the contacts 821, this circuit is not completed at this time. The opening of the contacts 602 removes ground from the conductor 609 and, accordingly, interrupts the above described operating circuit for the kickoff relay 1230. However, this relay is slow-to-release and, accordingly, the operating circuit for the guard relay 1220 is not again completed at this time.

The above described release of the guard relay 1220 further opens the contacts 1223 to interrupt the operating circuit for the "Y" stop relay 1280 so that this relay releases to close the contacts 1281, thereby preparing a portion of the operating circuit for the pulse assist relay 1270 which is opened at the contacts 1224. The opening of the contacts 1225 interrupts the operating circuit for the "X" stop relay 1260 so that this relay releases to close the contacts 1261 and 1263 and to open the pair of contacts 1262. The closure of the contacts 1261 prepares the operating circuit for the "X" delay relay 1240, and the closure of the contacts 1263 prepares an operating circuit for the X motor magnet of the next trunk finder switch selected by the allotter 1200. The opening of the contacts 1262 interrupts an additional point in the operating circuit for the Y motor magnet 1150.

The opening of the contacts 1223 interrupts the series operating circuit for the identification relay 240 in the trunk circuit 210 and the "Y" stop relay 1280 in the identifier sender allotter 1200. The release of the "Y" stop relay 1280 closes the contacts 1281 to prepare a portion of the operating circuit for the pulse assist relay 1270, which circuit is now interrupted at the open contacts 1224. The release of the identification relay 240 terminates the application of the identification potential over the extended switch train to the identification matrix 110 and the identifier circuit 130, thereby completing the release of these common circuit components to permit their use in identifying subsequently placed calls. It should be noted that these components of the circuit are released prior to release of the operated identifier sender 700 which contains registered information for transmission to the trunk recorder 160. However, since a plurality of identifier senders, similar to the sender 700, are provided, the release of the identifier circuit 300 and the identification matrix 110 permits these circuit components to be immediately reused under the control of the identifier sender allotter 1200 to identify the calling subscriber involved in a subsequently placed toll call.

The release of the identification relay 240 causes the release of the allotter start relay 250 and the bank marking relay 260 so that the contacts 251, 261, and 262 are opened. The opening of the contacts 262 interrupts an additional point in the above described operating circuit for the identification relay 240 and removes ground marking from the bare wire multiple engaged by the wiper 833. The opening of the contacts 261 removes ground from the contact bank engaged by the wiper 834 so that the opening of the contacts 261 and 262 prevents additional trunk finder switches from attempting to seize the trunk circuit 210. The release of the allotter start relay 250 to open the contacts 251 removes ground from the common start lead 252, thereby to prevent reoperation of the guard relay 1220.

To advance the switch in the identifier sender allotter 1200, the release of the guard relay 1220, in closing the contacts 1221, completes an operating circuit for the motor magnet 1210 which extends through the interrupter contacts 1211, the closed contacts 1251 and 1221, the wiper 1213, and then to ground through either of the pairs of closed off normal contacts 1143 or 1151. Operation of the motor magnet 1210 prepares the wipers 1212 to 1219, inclusive, for movement into engagement with the contacts forming the next stepping position. Operation of this motor magnet further opens the interrupter contacts 1211 to interrupt the above described operating circuit so that the motor magnet 1210 releases to advance the plurality of wipers 1212–1219 a single step. In the event that the identifier sender and the trunk finder switch associated with the contacts forming the next stepping position are in a busy condition, as indicated by closed off normal contacts such as the contacts 1143 or 1151, ground is again returned to operate the motor magnet 1210. In this manner, the motor magnet 1210 operates and releases to advance the wipers 1212–1219 to a position in which an idle identifier sender is located, as determined by the absence of ground on the contact engaged by the test wiper 1213. At this time, intermittent operation of the motor magnet 1210 is terminated with the wipers 1212 to 1219, inclusive, in engagement with the idle identifier sender which is next to be associated with a calling trunk circuit in response to the application of start ground to the allotter start conductor 252.

In order to return the trunk finder switch 1100 of the seized identifier sender 700 to a normal position following the completion of the transmission of the registered information from the identifier sender 700 to the trunk recorder 160, the trunk finder switch 1100 includes the reset magnet 1160. In response to the completion of the transmission of the calling substation information to the trunk recorder 160, the designation complete relay 820 is released to close the contacts 821. Since the cut-through relay 600 has previously been released, as described above, to close the contacts 601, ground is extended from the closed and grounded contacts 601 through the contacts 821 and either of the pairs of closed off normal contacts 1144 or 1152 to complete an operating circuit for the reset magnet 1160. In operating, the motor magnet 1160 closes a pair of interrupter contacts 1161 and also mechanically returns the plurality of wipers 830–834 to their normal home position, thereby interrupting the interconnection of the identifier sender 700 with the trunk recorder 160 and the trunk circuit 210.

In returning these wipers to their normal home position, the plurality of off normal contacts 1143, 1144, 1151, and 1152 are opened, and the off normal contacts 1142 are closed. The closure of the contacts 1142 establishes another operating path for the all-senders-busy relay 1250, thereby to indicate that the identifier sender 700 is now idle. The opening of the contacts 1151 and 1143 removes ground from the contact in the bank engaged by the wiper 1213 which is individual to the identifier sender 700 to indicate that the identifier sender 700 is idle and may be seized or preselected by the identifier sender allotter 1200 for subsequent association with a calling trunk circuit. The opening of the contacts 1144 and 1152 interrupts the above described operating circuit for the reset magnet 1160 to permit this magnet to release and, in doing so, to restore the trunk finder switch 1100 to its normal condition.

The closure of the contacts 1161, in response to operation of the reset magnet 1160, provides an alternative source of ground extending to the contact engaged by the wiper 1213 of the stepping switch in the identifier sender allotter 1200 to cause the identifier sender 700 to test busy during the resetting of the trunk finder switch 1100. It is desirable to busy out the identifier sender 700 during this interval to insure that the trunk finder switch 1100 will not be seized for use in associating the identifier sender 700 with a calling trunk circuit until such time as all of the wipers of the trunk finder switch 1100 have been returned to their normal position, as indicated by the opening of the X and Y off normal contacts 1143 and 1152 and by the consequent release of the reset magnet 1160.

To provide means for resetting the switch 1100 when the switch fails to detect ground in the course of the hunting operation described above, a pair of overflow contacts 1162 are provided. These contacts are closed whenever the wipers 830–834 are advanced more than ten steps in either of the two mutually perpendicular directions of movement. Closure of the contacts 1162 supplies ground to the conductor 609 and, accordingly, operates the kickoff relay 1230. Operation of this relay actuates the allotter 1200 to release the identifier sender 700 and to search for the next idle unit. Further, since one of the pairs of off normal contacts 1144 or 1152 must be closed before the switch 1100 can be advanced into an overflow condition, the advance of the allotter 1200 results in the operation of the reset magnet 1160 to restore the trunk finder switch 1100 to its normal position.

Accordingly, the identifier sender allotter 1200 provides means for preselecting an idle identifier sender 700 and for operating the trunk finder switch 1100 associated with the preselected identifier sender to associate this identifier sender with both a calling trunk circuit, such as the circuit 210, and the common identifier circuit 300 so that the preselected identifier sender is conditioned to receive digital information representing the designation of the calling substation. The allotter 1200 further includes means for operating the trunk circuit to initiate the application of the identification potential to the common identifying equipment in response to the completion of the association of the idle identifier sender with the trunk circuit and means for terminating the application of this potential to the identifying equipment, for releasing the interconnection between the seized identifier sender and the common identifier circuit 300, and for stepping to preselect another identifier sender in response to the completion of the storage of the necessary digital information in the seized identifier sender.

*Identification Matrix 110*

The identification matrix 110 (FIG. 1) is selectively energized by the identification potential returned over the extended switch train from the trunk circuit to provide a group of discrete signals, each representing one digit of the designation of the calling substation, which is connected to the input of the common identifier circuit 300. The amplifying and detecting channels in the circuit 300 provide coded signals representing the designation of a calling substation for storage in a seized identifier sender. Since the identification matrix 110 is only utilized for the short interval of time necessary to establish the registration of the digits of the designation of the calling substation in the identifier sender, a single identification matrix, such as the matrix 110, is capable of performing a number of calling line identification operations within the time interval required to transmit the information registered in the identifier sender. Accordingly, the identification matrix 110 and the identifier circuit 300 are only associated with a given trunk circuit and its associated identifier sender for the short interval of time which is necessary to establish the calling line designation information in the identifier sender 700.

Referring now more specifically to the identification matrix 110, the details of a suitable identification matrix 110 are shown in the above identified copending Morris et al. application, Serial No. 536,571, and may comprise, in addition to a private line and terminal per line matrix for identifying calling substations on private lines and terminal per station lines, a plurality of individual party matrices equal in number to the number of subscribers provided on terminal per line multiparty lines. The output of the private line and terminal per station matrix is directly connected to the input of the common identifier circuit 300 and, as set forth in the above identified copending Morris et al. application, the individual party matrices are selectively interconnected with the input to the identifier circuit 300 in accordance with the position of the calling substation on the terminal per line multiparty line.

FIG. 1 of the drawings discloses, in schematic block form, a pair of resistance clusters each including four individual elements for selectively providing marking or signaling conditions representing four digit calling line designations. Each of the resistance clusters is individual to a single line so that for terminal per station and private lines, only a single resistance cluster in the identification matrix 110 is energized by the identification potential returned from the trunk circuit over the extended switch train. More specifically, as set forth above, the calling substation A is designated CL 3–6134, but since all of the subscribers in a particular office are designated by identical office code designations, i.e. CL 3, only the four numerical digits of the directory number of the substation A must be determined by the automatic calling line identification equipment.

In order to provide a means for identifying the calling substation A, an identification conductor 111 interconnects the HS lead of the extended switch train with a cluster in the identification matrix 110 which includes four individual resistors 112, 113, 114, and 115 representing the units, tens, hundreds, and thousands digits, respectively, of the directory number of the calling substation A. Since the value of the thousands digit of this designation is "6," the resistor 115 is connected to a common output bus 116 representing the thousands digit "6" which extends to the identifier circuit 300 through a thousands digit cable 120. In a similar manner, the resistors 114, 113, and 112 representing the hundreds, tens, and units digits "1," "3," and "4" are connected to similarly designated busses in hundreds, tens, and units digit output cables 130, 140, and 150, respectively.

To selectively energize the identifier circuit 300 in accordance with the digits forming the designation of the calling substation A, as described above, the completion of the association of the idle identifier sender 700 with the trunk circuit 210 operates the identification relay 240 to close the contacts 241. The closure of these contacts extends a suitable alternating current identification potential from a source 211 thereof over the HS lead of the extended connection so that the identification conductor 111 individual to the calling substation A is energized. This potential is further transmitted through the resistors 112–115 to be supplied through the output cables 120, 130, 140, and 150 to the input of the identifier circuit 300 wherein these signals are detected and converted into marking conditions representing the values of the digits of the designation of the substation A, which digital information is then registered in the identifier sender 700. Following the completion of the establishment of this information in the sender 700, the identification relay 240 is released to open the contacts 241, thereby terminating the energization of the identification matrix 110 to permit the identification matrix 110 and the identifier circuit 300 to be utilized in establishing the designations of subsequent calling substations.

*Identifier Circuit 300*

The identifier circuit 300 (FIGS. 3–5) includes a thousands digit identifier circuit 310, a hundreds digit identifier circuit 500, a tens digit identifier circuit 510, and a units digit identifier circuit 520, each of which includes ten amplifying and detecting channels which are responsive to the four input conductors selectively energized by the identification matrix 110 so as to provide coded output signals representing these four digits. The signals representing these four digits are transmitted from the circuit 300 to the digit registers in the seized identifier sender 700 to be stored therein to control the subsequent transmission of signals to the trunk recorder 160. Since the identifier circuit 300 is only utilized for amplifying and detecting the designation representing signals provided by the identification matrix 110 during the interval in which the identification matrix 110 is energized under the control of the trunk circuit 210, the identifier circuit 300 is quickly released following the establishment of the necessary digital information in the identifier sender 700 and is immediately available for reuse in determining the designations of the substations involved in subsequently placed toll calls.

Referring now more particularly to the thousands digit identifier circuit 310 (FIGS. 3 and 4), this circuit includes ten identical amplifying and detecting channels 320, 330, 340, 350, 360, 400, 420, 430, 440, and 450 representing the digits "1" to "9," inclusive, and "0," respectively. Each of these channels is provided with one of a plurality of output thyratron tubes 370, 371, 372, 373, 374, 415, 425, 435, 445, and 455 for selectively operating one of a plurality of output coding relays 380, 390, 391, 392 393, 460, 470, 480, 490, and 495, respectively. In response to the selective energization of one of the amplifying and detecting channels, its associated thyratron output tube and output relay are rendered operated for the period that the identification potential is applied to the identification matrix 110 to establish two out of five marking conditions on common output conductors 480, 481, 482, 484, and 487 extending to the inputs of all of the identifier senders. However, these signals are only effective to control the registers in the identifier sender 700 which has previously been associated with the calling trunk circuit 210 and cut through to the identifier circuit 300.

In the typical call set forth above in which the call is extended from the substation A, designated as CL 3–6134, the resistance element 115 representing the thousands digit "6" is selectively energized by the identification potential so that this potential is extended over a conductor 116 and the cable 120 to the input of the thousands digit "6" channel 400. This signal is supplied to the grid of an amplifier 405 through a coupling condenser 401 which serves to block spurious direct current signals which may be applied to the conductor 116. The input grid circuit to the amplifier 405 also includes a grid resistor 402 and a filter section comprising a resistor 403 and a condenser 404 which is adapted to pass signals of the frequency of the identification potential and to discriminate against signals of other frequencies wihch may be picked up or applied to the input path to the amplifier 405. The output of the amplifier tube 405, which is provided with an anode resistor 408 connected to a terminal 407 supplied with a suitable B+ operating potential, is supplied through a coupling condenser 409 to a detecting diode 410. The anode of the diode 410 is supplied with a fixed negative bias by a potentiometer 411, and the anode-cathode path of the tube 410 is hunted by a resistor 412.

The detector 410 is utilized to provide a relatively steady state positive direct current voltage for rendering the ouput thyratron tube 415, forming a portion of the channel 400, conductive to indicate that the value of the identified thousands digit of the designation of the substation A is "6." More specifically, due to the negative bias on the anode of the diode 410, a portion of the negative half cycles of the alternating current signal supplied to the coupling condenser 409 is clipped off so that the positive portions of this signal are utilized to slowly charge a condenser 414 through a series resistor 413, the resistor 413 and the condenser 414 also effectively providing a filter adapted to remove ripple from the signal provided by the detector 410. By the selection of a suitable time constant for charging the condenser 414, the channel 400 is able to distinguish between relatively short duration spurious signals which cause false identification and the relatively longer duration signals due to the application of the identification potential to the channel input.

When the direct current signal provided across the condenser 414 attains a predetermined value, this voltage, which is coupled to the control electrode of the thyratron output tube 415 through a series grid resistor 416, renders the thyratron 415 conductive. The anode of the thyratron 415 is provided with a suitable alternating current signal from a terminal 467 through an anode resistor 417 and the winding of the output coding relay 460. Rendering the thyratron 415 conductive operates the coding output relay 460 to close a plurality of contacts 461 and 462, the winding of the relay 460 being shunted by a detecting condenser 464 to prevent this relay from chattering and to insure that the relay is not released on the negative half cycles of the alternating current supplied to the anode of the thyratron 415. The thyratron 415 remains conductive until such time as the direct current potential provided across the condenser 414 is reduced to a value below that necessary to maintain conduction in this tube.

The operation of the coding output relay 460 provides two out of five marking conditions representing the value of the identified thousands digit of the designation of the calling substation A by extending ground to two out of the five marking conductors 480, 481, 482, 484, or 487, these conductors having a code significance of "0," "1," "2," "4," and "7," respectively. Since the value of the identified digit represented by the selective energization of the channel 400 is "6," the operation of the coding output relay 460 extends ground to the coded marking conductors 482 and 484. These conductors are common to all of the identifier senders to which the allotter 1200 has access, but the extension of ground to two of the conductors in accordance with the value of the identified thousands digit is only effective to establish a registration of the value of this digit in the single identifier sender 700 which previously has been conditioned for the receipt of this information by the selective operation of the cut-through relays 700 and 920.

The values of the hundreds, tens, and units digits of the directory number of the calling substation A are similarly determined by the hundreds digit identifier circuit 500, the tens digit identifier circuit 510, and the units digit identifier circuit 520, all of which are identical to the thousands digit identifier circuit 310. More specifically, the selective energization of the resistors 114, 113, and 112 representing the values of the hundreds, tens, and units digits "1," "3," and "4" energizes conductors corresponding to the code output conductors 480 and 481 in a hundreds digit output cable 501, conductors similar to the code conductors 481 and 482 in a tens digit output cable 511, and code conductors similar to the conductors 480 and 484 in a units digit output cable 521. These cables extend to the hundreds digit, tens digit, and units digit registers of all of the identifier senders to which the allotter 1200 has access but are only effective to produce the registration of these digits in the single identifier sender 700 which previously has been cut through to the common identifier circuit, as described above.

Following the completion of the storage of the necessary digital information representing the entire designation of the calling substation A in the seized identifier sender 700, the identification potential in the trunk circuit 210 is removed from the HS lead of the extended switch connection, thereby to terminate the energization of the identification matrix 110 and, accordingly, of the identifier circuit 300. The removal of this alternating current potential permits the charge accumulated on the condenser 414 and the similar condensers in the hundreds digit identifier circuit 500, tens digit identifier circuit 510, and units digit identifier circuit 520 to be dissipated so that the bias on the control electrodes of the output thyratron tubes, similar to the tube 415, is no longer sufficient to maintain these tubes conductive. Accordingly, when the succeeding negative half cycles of the alternating current potential are provided at the anodes thereof, the four selectively fired output tubes are rendered nonconductive, to release their associated coding output relays, similar to the relay 420. The release of these relays, in opening contacts similar to the contacts 461 and 462, removes the marking conditions extending to the digit registers in the seized and cut through identifier sender 700 and thus completes the restoration of the identifier circuit 300 to its normal condition in which it is capable of being utilized in determining the designation of substations involved in subsequently placed toll calls.

Accordingly, the identifier circuit 300 is selectively provided with a number of alternating current signals equal to the number of digits in the designation to be identified, and these signals are amplified and detected in separate identifying circuits, such as the circuits 310, 500, 510, and 520, to operate output means for establishing marking conditions which operate register relays in the seized identifier sender representing the values of the identified digits forming the directory number of the calling substation. Immediately following the establishment of these registrations and prior to the completion of the transmission of this information to the trunk recording means, the identifier circuit 300 is dismissed and returned to a condition in which it is capable of being utilized in identifying other calling subscribers.

*Identifier Sender 700*

The identifier sender 700 includes the trunk finder switch 1100 by which the identifier sender 700 is associated with a calling trunk circuit, such as the circuit 210, and further includes a thousands digit register 660, a hundreds digit register 670, a tens digit register 900, and a units digit register 910, the inputs to which are cut through to the output of the identifier circuit 300 so that the values of the digits forming the designation of a calling substation can be stored therein during an identification operation. Following the completion of the storage of this information in the identifier sender 700, a pulsing source therein is rendered effective to transmit a number of mark pulses equal to the value of the registered thousands digit followed by a space pulse to the trunk recorder 160 under the control of the thousands digit register 600 and a counting chain 850 which is operated in synchronism with the transmitted pulses. The pulsing means further includes means for transmitting an advance pulse for advancing the magnetic tape 168 in the trunk recorder 160 following the recording of each of the mark and space pulses. Following the completion of the transmission of the pulses representing the values of the thousands digit, stop means controlled by the thousands digit register 660 and the counting chain 850 are rendered effective to interrupt the transmission of additional pulses to the trunk recorder. The counting chain 850 is then restored to a normal condition, the thousands digit register 660 is rendered ineffective, and the hundreds digit register 670 is rendered effective to control the next cycle of operation of the pulsing means and of the counting chain 850. In this manner, four spaced groups of mark pulses separated by space pulses are transmitted from the identifier sender 700 in accordance with the values of the digits stored in the registers 660, 670, 900, and 910 representing the designation of the calling substation A. In response to the completion of these pulse transmitting operations, the identifier sender 700 restores the trunk finder switch 1100 to its normal position to open the interconnection of the trunk circuit 210 and the trunk recorder 160 with the identifier sender 700, thereby to return the identifier sender 700 to an idle condition.

As set forth above in the description of the operation of the identifier sender allotter 1200, in response to the operation of the guard relay 1220, the contacts 1222 are closed to supply ground over the wiper 1214 to the conductor 1291. The application of ground to this conductor operates the cut-through relays 600 and 920 to open the contacts 601 and to close the contacts 602 to 607, inclusive, and the contact groups 608, 921, and 922. The closure of the contacts 603, 604, 605, 606, and 607 interconnects the code conductors 480, 481, 482, 484, and 487 with the operating windings of the five code register relays 610, 620, 630, 640, and 650 forming the thousands digit register 660, thereby to prepare these relays for selective operation in accordance with the signals provided by the thousands digit identifier circuit 310. In a similar manner, the closure of the groups of contact 608, 921, and 922 prepare paths for interconnecting similar register relays in the hundreds digit register 670, the tens digit register 900, and the units digit register 910 with the code conductors in the output cables 501, 511, and 521.

The opening of the contacts 601 interrupts one point in the operating circuit for the reset magnet 1160 of the trunk finder switch 1100. The closure of the contacts 602 applies ground to a conductor 609 which extends to the open contacts 822 to prepare the above described operating circuit for the kickoff relay 1230 in the allotter 1200.

The trunk finder switch 1100 is then operated under the control of the identifier sender allotter 1200 to search for and seize the trunk circuit 210 and to operate the identification relay 240 therein so that the identification potential is returned over the extended switch train and through the identification matrix 110 and the identifier circuit 300 to operate a single output coding relay in each of the identifier circuits 310, 500, 510, and 520. As described above, the thousands digit of the designation of the calling substation A is "6" and, accordingly, the coding relay 460 is operated to close the contacts 461 and 462 so that ground is forwarded over the conductors 482 and 484 and through the closed contacts 605 and 606 to be applied to the operating windings of the register relays 630 and 640. The completion of these circuits operates the relay 630 and 640 to close a plurality of contacts 631 to 636, inclusive, and 641 to 646, inclusive.

The closure of the contacts 634 and 644 completes a series circuit for interconnecting the output of the counting chain 850 with the input to a thousands stop tube 710 through a cable 680. More specifically, since the value of the thousands digit as represented by the operated relays 630 and 640 is "6," the closure of the contacts 634 and 644 interconnects the anode of a "6" manifesting tube 870 in the counting chain 850 with the control electrode of the cold cathode thousands digit stop tube 710 through a coupling condenser 715. The preparation of this circuit indicates that the transmission of pulses from the identifier sender 700 representing the value of the thousands digit of the directory number of the calling substation A is to be terminated following the transmission of six mark pulses to the trunk recorder 160. The closure of the contacts 632, 633, 635, 642, 643, and 645 performs no useful function at this time inasmuch as these contacts form portions of control paths representing digits other than the digit "6" and, accordingly, are not completed by the operation of the register relays 630 and 640.

The closure of the contacts 636 and 646 prepares holding circuits for the register relays 630 and 640 extending over a common hold conductor 835 to a pair of normally open contacts 824. The closure of the contacts 631 and 641 prepares two parallel paths in an operating circuit for a designation complete relay 820.

The selective operation of relays in the hundreds digit register 670 corresponding to the relays 610 and 620, in the tens digit register 900 corresponding to the relays 620 and 630, and in the units digit register 910 corresponding to the relays 610 and 640 similarly provide control paths for interconnecting the control electrode of a hundreds digit stop tube 730 with the anode of a prime or "1" manifesting tube 795, for connecting the control electrode of a tens digit stop tube 1000 with the anode of a "3" manifesting tube 855, and for connecting the control electrode of a units digit stop tube 1020 with the anode of a "4" manifesting tube 860 in the counting chain 850, respectively. These circuits prepare the pulsing components in the identifier sender 700 for transmitting a single pulse representing the hundreds digit "1," three mark pulses representing the value of the tens digit "3," and four mark pulses representing the units digit "4," respectively. In addition, the selective operation of the register relays in the registers 670, 900, and 910 closes contacts similar to the contacts 636 and 646 for preparing holding circuits for the operated ones of the register relays in these registers which extend to the common hold conductor 835.

In order to initiate the release of the identifier circuit 300 and the identification matrix 110 and to initiate the transmission of pulses representing the digits stored in the identifier sender 700 to the trunk recorder 160, the register relays in the registers 670, 900, and 910 close contacts similar to the contacts 631 and 641 to complete an operating circuit for the designation complete relay 820. This series circuit extends from a pair of grounded and normally closed contacts 1042 over a conductor 1099 and through at least one pair of closed contacts in each of the registers 660, 670, 900, and 910 to the winding of the designation complete relay 820. Since this circuit includes a pair of contacts controlled by a register relay in each one of the register circuits, the designation complete relay 820 cannot be operated to initiate further operation of the identifier sender 700 until such time as each of the digits of the designation of the calling substation is stored in its corresponding register in the identifier sender 700. The operation of the designation complete relay 820 opens the contacts 821 and closes a plurality of contacts 822, 823, 824, 825, 826, 827, 828, and 829.

The closure of the contacts 824 supplies ground to the common hold conductor 835 so that the operated relays in the registers 660, 670, 900, and 910 are held operated when the identifier circuit 300 and the identification matrix 110 are released. The closure of the contacts 823 supplies a B+ operating potential to the anodes of the stop tubes 710, 730, 1000, and 1020 to condition these tubes for operation. The opening of the contacts 821 opens an additional point in the operating circuit for the reset magnet 1160 to prevent the operation of this magnet until the designation complete relay 820 is released.

As indicated above, the operation of the designation complete relay 820 signifies that all of the digits of the designation of the calling substation A have been stored in the identifier sender 700 and, accordingly, the closure of the contacts 822 completes the above described operating circuit for the kickoff relay 1230 in the identifier sender allotter 1200 so that the motor magnet 1210 is operated and released to advance the wipers controlled thereby to search for and seize an additional idle identifier sender, such as the sender 700, for association with the next calling trunk circuit. Incident to this operation and as set forth in detail above, ground is removed from the conductor 1291 by the opening of the contacts 1222 to release the cut-through relays 600 and 920. The release of these two relays opens the connection between the registers 660, 670, 900, and 910 and the identifier circuit 300. However, the opening of this connection does not result in the release of the operated register relays in the individual register circuits in the identifier sender 700 due to the prior closure of the contacts 824 to complete the holding circuits for these operated register relays. In addition, the opening of the contacts 602 in response to the release of the cut-through relay 600 opens the operating circuit for the kickoff relay 1230 which releases after a suitable time delay to return the identifier sender allotter 1200 to its normal condition. The concurrent closure of the contacts 601 prepares the operating circuit interrupted at the open contacts 821 for the reset magnet 1160 of the trunk finder switch 1100.

The operation of the designation complete relay 820 also prepares pulsing paths for transmitting pulses from the identifier sender 700 to the trunk circuit 210 and the trunk recorder 160. More specifically, the closure of the contacts 825 interconnects the wiper 830 with a pair of normally open contacts 763. The wiper 830 is in engagement with a bare wire multiple to which is connected a conductor 164 which extends through the trunk circuit 210 to the operating winding of the space pulse head 161, thereby preparing a path for transmitting pulses to the space head 161. The closure of the contacts 826 completes an energizing circuit for the mark pulse head 162 extending from a pair of normally closed and grounded contacts 752 through a plurality of closed contacts 783, 764, 826, the wiper 831, the conductor 165, and then to grounded battery through the winding of the mark pulse head 162. The energization of the mark pulse head 162 initiates the recording of a single mark pulse in the mark pulse channel 168*a* of the magnetic tape 168. The closure of the contacts 827 prepares a path for transmitting pulses to an advance relay 230 in the trunk circuit 210. This circuit extends from the operating winding of the advance relay 230 to the bare wire multiple engaged by the wiper 832 and thence through the closed contacts 827 to a pair of normally open contacts 753. Accordingly, the operation of the designation complete relay 820 energizes the mark head 162 to record a single mark pulse on the mark pulse channel 168*a* of the magnetic tape, and prepares paths for transmitting advance pulses to the relay 230 in the trunk circuit 210 and space pulses to the space pulse head 161 in the trunk recorder 160.

The operation of the designation complete relay 820 also initiates operation of a pulsing source including a pulsing relay 750, an amplifier 799, and a pair of tubes 840 and 850 which are connected to provide a conventional multivibrator. This pulsing source transmits mark, space, and advance pulses to the trunk circuit 210 and to the trunk recorder 160 and also serially advances the counting chain 850. More specifically, prior to the operation of the designation complete relay 820, a condenser 851, which is connected between the control electrode of the tube 840 and the anode of the tube 850, is charged to B+ potential, and the control electrode of the tube 840 is effectively maintained at ground. When the designation complete relay 820 operates, the contacts 828, which are of the preliminary make type, operate first to ground the cathode of the tube 850 and to initiate the charging of a condenser 841. The charging current for the condenser 841 passes through a grid bias resistor 852 to provide a positive voltage on the control electrode of the tube 850 to render this tube conductive. The subsequent closure of the contacts 829 prepares the amplifier tube 799 and the tube 840 in the multivibrator for operation, but these tubes remain cut off because the anode potential of the tube 850 decreases due to the conduction thereof in response to the prior closure of the contacts 828. After a suitable time interval, the charge on the condenser 851 leaks off through the conductive tube 850 so that the potential on the control electrode of the tube 840 becomes more positive and this tube begins to conduct, thereby reducing the anode potential on this tube to reduce the control electrode potential of the tube 850. In this manner, the tubes 840 and 850 are alternately rendered conductive and nonconductive.

In order to drive the pulsing relay 750, when the potential on the control electrode of the tube 840 becomes enough positive that the tube 840 begins to conduct, the amplifier tube 799 is also rendered conductive since the control electrodes thereof are strapped to the control electrode of the tube 840. When the amplifier tube 1070 which isolates the winding of the pulsing relay 750 from the multivibrator is rendered conductive, the pulsing relay 750 is operated to open a plurality of contacts 751, 752, and 754 and to close the contacts 753. The opening of the contacts 751 produces no useful function at this time. The opening of the contacts 752 terminates the energization of the mark pulse head 162 over the circuit described above to terminate the recording of the first mark pulse on the mark pulse channel 168*a* of the magnetic tape 168.

In order to advance the magnetic tape 168 in the trunk recorder 160 following the recording of the first pulse thereon, the closure of the contacts 753 extends ground through the closed contacts 827 and the wiper 832 to energize the advance relay 230. In operating, the advance relay closes a pair of contacts 231 to complete an obvious operating circuit for the advance magnet 163. The operation of the advance magnet 163 actuates a stepping mechanism disclosed in the above identified Gleason patent to advance the magnetic tape 168 through a single step, thereby to prepare this tape for receiving the next pulse to be recorded.

The operation of the pulsing relay 750 also advances the counting chain 850 a single step so that this counting chain is advanced in synchronism with the transmission of mark and space pulses to the trunk recorder 160. More specifically, the counting chain 850, which preferably is of the type shown and described in an article entitled "Cold-Cathode Counting Circuits" by H. L. Foote appearing in Communication and Electronics, May 1955, No. 18, comprises a drive tube 790, a normally conductive prime or digit "1" manifesting tube 795, and a plurality of tubes 845, 855, 860, 865, 870, 875, 1180, 1185, 1190 and 1195 representing the digits "2" to "9," inclusive, and "0." As described in the above identified article, when the drive tube 790 is fired, an increased current momentarily flows through a cathode resistor 798 to charge a condenser 796, thereby raising the potential of the cathode of the tube 795 and also of all of the other tubes in the chain 850 to extinguish the then conducting tube. In the first step of the chain 850, the prime tube 795 is extinguished in response to the first firing of the drive tube 790. The drive tube 790 is extinguished by relaxation by strapping the anode thereof directly to the B+ potential and by providing a large value cathode resistor 794.

Extinguishing the prime or "1" manifesting tube 795 provides a positive pulse which is coupled to the control electrode of the "2" manifesting tube 845 to render this tube conductive as a representation that the first mark pulse has been transmitted from the identifier sender 700 and that the second mark pulse is the next pulse to be transmitted. In like manner, the other tubes forming the counting chain 850 are sequentially rendered conductive and then extinguished each time that the drive tube 790 is fired and extinguished.

Referring more specifically to the operation of the counting chain 850 under the control of the pulsing relay 750, when this relay operates to open the contacts 754, a pair of resistors 791 and 792, which are normally connected in series between B+ potential and ground to form a voltage divider, are disconnected so that the left hand plate of a condenser 793 immediately goes to B+ voltage to drive the control electrode of the drive tube 790 more positive. The condenser 793 also starts to charge through the lower of a pair of resistances forming a potentiometer 797. The divider 797 normally provides a positive bias for the drive tube 790 so that the positive pulse applied to the control electrode thereof due to the opening of the contacts 754 fires this tube to extinguish the normally conductive prime or "1" manifesting tube 795 and to fire the "2" manifesting tube 845. The positive pulse provided by extinguishing the tube 795 is also coupled over the anode conductor connected thereto and the cable 680. This conductor, as set forth above, is connected to the control electrode of the hundreds digit stop tube 730 through the coupling condenser 731, but the control electrode of this tube 730 is not provided with an effective operating bias, and, accordingly, this pulse does not fire the stop tube 730.

Following a time interval determined by the constants of the multivibrator, the tube 840 is cut off, and the tube 850 begins to conduct heavily to reduce the potential on the control electrodes of the amplifier tube 799 so that this tube is cut off to release the pulsing relay 750 to close the contacts 751, 752, and 754 and to open the contacts 753. The closure of the contacts 751 produces no useful function, and the opening of the contacts 753 releases the advance relay 230 in the trunk circuit 210 to open the contacts 231 to release the advance magnet 163 in the trunk recorder 160. The closure of the contacts 752 completes the above described energizing path for the mark pulse head 162 in the trunk recorder 160 to record a second mark pulse on the mark pulse channel **168*a*. The closure of the contacts 754 connects the resistors 791 and 792 in series between ground and B+ potential to reduce the voltage applied to the left hand plate of the condenser 793 and to provide a discharging path for this condenser. Therefore, in response to a single operation and release of the pulsing relay 750, the counting chain 850 is advanced a single step, and the advance magnet 163 is operated and released to step the magnetic tape a single step. In addition, the release of the pulsing relay 750 again energizes the mark pulse head 162 in the trunk recorder 160, thereby to record a second mark pulse on the tape 168**.

Therefore, the continuing intermittent operation of the multivibrator intermittently operates the amplifier tube 799 so that the pulsing relay 750 is operated and released to advance the counting chain 850 and to record mark pulses on the magnetic tape 168 of the trunk recorder 160. At the end of four more cycles of operation, the "6" manifesting tube 870 is conducting, the tubes 855, 860, and 865 having been fired and extinguished. Further, four additional mark pulses have been recorded on the mark pulse channel **168*a* of the magnetic tape 168, the mark pulse head 162 being energized at this time to record the fourth additional or sixth mark pulse on the channel 168*a*. During this continuing intermittent operation, the "3" manifesting tube 855 is extinguished to supply a positive pulse through the coupling condenser 1001 to the control electrode of the tens digit stop tube 1000, but this tube is not fired inasmuch as the control electrode is not provided with an operating potential. In a similar manner and as described above, the "4" manifesting tube 860 is extinguished to pulse the units digit stop tube 1020 through the coupling condenser 1021 and the units digit register 910, but the control electrode of the tube 1020** is likewise not provided with an enabling potential.

When the pulsing relay 750 is next operated by the multivibrator, the contacts 751, 752, and 754 are opened, and the contacts 753 are closed. The opening of the contacts 751 interrupts a point in an operating circuit for a pair of relays 770 and 800. The opening of the contacts 752 terminates the energization of the mark pulse head 162 in the trunk recorder 160 to terminate the recording of the sixth mark pulse thereon. The closure of the contacts 753 energizes the advance relay 230 to close the contacts 231, thereby operating the advance magnet 163 in the trunk recorder 160 to advance the magnetic tape 168 a single step following the recording of the sixth mark pulse thereon. The opening of the contacts 754 provides a positive pulse for operating the drive tube 790 so that the "6" manifesting tube 870 is extinguished and the "7" manifesting tube 875 is fired.

However, since the six pulses representing the value of the thousands digit "6" of the directory number of the calling substation A have been recorded on the magnetic tape in the trunk recorder 160, the thousands digit stop tube 710 is fired to prevent the transmission of additional thousands digit pulses to the trunk recorder 160. More specifically, and as described above, the control electrode of the thousands digit stop tube 710 is connected through the coupling condenser 715, and the closed contacts 634 and 644 of the thousands digit register circuit 660 to the anode of the "6" manifesting tube 870. Accordingly, when this tube is extinguished, the positive pulse provided at the anode is coupled through the above described circuit to be applied to the control electrode of the thousands digit stop tube 710. This control electrode is provided with a normal operating potential by a voltage divider including a pair of resistors 713 and 714 so that this tube is fired in response to extinguishing the "6" manifesting tube 870. When the stop tube 710 is fired, the flow of cathode current through a pair of series cathode resistors 711 and 712 provides a positive pulse which is coupled through a condenser 721 to the control electrode of a tube 720, thereby rendering this tube conductive.

Firing the tube 720 completes an operating circuit for an end-of-digit relay 760 which extends through a pair of normally closed contacts 804. The operation of the end-of-digit relay 760, which signifies the termination of the transmission of the group of mark pulses relating to the value of a digit to be transmitted, closes a plurality of contacts 761, 762, 763, 765, and 766 and opens the contacts 764. To prevent the stop tubes 730, 1000, and 1020 from being inadvertently fired during the switching operations incident to the termination of the transmission of the pulses representing the transmitted thousands digit, the closure of the contacts 761, 765, and 766 connects the control electrodes of these stop tubes to ground, thereby preventing the inadvertent firing thereof. Since the group of mark pulses representing the value of the identified thousands digit is to be followed by a space pulse, the opening of the contacts 764 interrupts the above described path extending to the mark pulse head 162, and the concurrent closure of the contacts 763 prepares a path extending from the now open contacts 752 through the closed contacts 783, 763, and 825 to the wiper 830 which is in engagement with the bare wire multiple to which is connected the winding of the space pulse head 161.

The closure of the contacts 762 completes an obvious operating circuit for a slow-to-release relay 810 which extends through a pair of normally closed contacts 801. The operation of the relay 810 closes a plurality of contacts 811 and 812. The closure of the contacts 811, in supplying an additional source of ground for the conductor 1099, performs no useful function at this time. The closure of the contacts 812 prepares a holding circuit for a reset relay 800 extending to a pair of open contacts 802.

When the multivibrator next switches to cut off the amplifier tube 799, the pulsing relay 750 releases to close the contacts 751, 752, and 754 and to open the contacts 753. The opening of the contacts 753 terminates the operation of the advance magnet 163 in the trunk recorder 160 to complete the step of movement of the magnetic tape following the recording of the sixth and last mark pulse of the group representing the value of the identified thousands digit. The closure of the contacts 752 completes the operating circuit for the space pulse head 161, described above, so that this head is energized to record a space pulse in the space pulse channel **168*b* immediately following the group of mark pulses representing the value of the identified thousands digit. The closure of the contacts 754 completes a discharging path for the condenser 793, but performs no other useful function at this time. The closure of the contacts 751 completes an operating circuit for the relay 770 which extends from the closed and grounded contacts 762 through the closed contacts 751 and 782**.

The operation of the relay 770 opens the contacts 771 and closes a pair of contacts 772. The opening of the contacts 771 removes one source of holding ground from the conductor 1099, but ground is maintained thereon by the closed contacts 811. The closure of the contacts 772 prepares an operating circuit for a relay 780, but this relay does not operate inasmuch as the operating winding thereof is provided with ground at both sides thereof from the closed contacts 762.

When the pulsing relay 750 is next operated, the opening of the contacts 752 terminates the recording of the space pulse on the space pulse channel **168*b*, and the closure of the contacts 753 again operates the advance magnet 163 to step the magnetic tape 168 a single step to space the space pulse head 161 from the space pulse previously recorded on the tape 168. The opening of the contacts 754 supplies an additional pulse to the counting chain 850 which extinguishes the tube 875 and fires the tube 880. However, the operation of the counting chain 850 serves no useful function at this time inasmuch as the thousands digit stop tube 710 has previously been rendered conductive, and the control electrodes of the remaining stop tubes 730, 1000, and 1020 have been connected to ground by the operation of the end-of-digit relay 760** to render them nonresponsive.

The opening of the contacts 751, however, interrupts the above described operating circuit for the relay 770, but this relay remains operated over a series circuit extending through the operating winding of the relay 780 to the closed and grounded contacts 762. The completion of this circuit operates the relay 780 to open the contacts 782 and 783 and to close a pair of contacts 781. The opening of the contacts 783 interrupts the pulsing path controlled by the contacts 752 on the pulsing relay 750, thereby to prevent the transmission of additional pulses to either the space pulse head 161 or the mark pulse head 162. The opening of the contacts 782 interrupts an additional point in the operating circuit for the relay 770. The closure of the contacts 781 prepares an operating circuit for the reset relay 800, which circuit is now open at the contacts 751.

When the multivibrator next releases the pulsing relay 750, the operations of the contacts 752 and 754 perform no useful function. The opening of the contacts 753 terminates the energization of the advance magnet 163, and the closure of the contacts 751 completes an operating circuit for the reset relay extending through the closed contacts 762, 751, and 781.

The operation of the reset relay 800 first closes a pair of preliminary make type contacts 802 to complete a holding circuit extending to the upper operating winding of the reset relay from the closed and grounded contacts 812 and, thereafter, closes a plurality of contacts 803 and 806 and opens a plurality of contacts 801, 804, and 805. The opening of the contacts 801 interrupts the operating circuit for the relay 810, but this relay, in being slow-to-release, does not release at this time. The opening of the contacts 805 extinguishes the conductive one of the counting tubes 845, 855, 860, 865, 870, 875, 1180, 1185, 1190, and 895 in the counting chain 850 by disconnecting the cathodes of these tubes from their common cathode resistor 798. The concurrent closure of the contacts 803 connects a B+ potential, which is supplied either through a series resistor 767 or through the operating winding of the end-of-digit relay 760, to the control electrode of the prime tube 795 in the counting chain 850, thereby priming this tube to a conductive state. It is possible to fire the "1" manifesting or prime tube 795 inasmuch as this tube remains connected to ground through the common cathode resistor 798.

In order to terminate intermittent operation of the pulsing relay 750 during the resetting operations, the closure of the contacts 806 connects a negative biasing potential through a series resistor 807 to the control grids of the amplifier tube 799 and of the multivibrator tube 840. Biasing the tube 840 to a substantially nonconductive state maintains the tube 850 conductive so that, when the rest relay 800 is released, the multivibrator will initiate its cycle of operation by firing the tube 840 and also the amplifier tube 799. The application of the negative potential to the control grids of the amplifier 799 maintains this tube cut off so that the pulsing relay 750 cannot be operated during the resetting operations.

The opening of the contacts 804 interrupts the above described operating circuit for the end-of-digit relay 760 and removes the source of anode potential for the energized tube 720 so that this tube is extinguished. The release of the end-of-digit relay 760 opens the contacts 761, 762, 763, 765, and 766, and closes the contacts 764. The opening of the contacts 761, 765, and 766 removes the direct ground connection to the control electrodes of the stop tubes 730, 1000, and 1020. The opening of the contacts 763 interrupts an additional point in the operating circuit for the space pulse head 161, and the closure of the contacts 764 prepares an operating circuit for mark pulse head 162, which circuit is interrupted at the open contacts 783.

The opening of the contacts 762 interrupts the operating and holding circuits for the relays 770 and 780 so that these relays release to close the contacts 771, 782, and 783 and to open the contacts 772 and 781. The closure of the contacts 771 provides an additional source of ground for the holding conductor 1099. The opening of the contacts 772 interrupts the holding circuit for the relay 770 at an additional point. The closure of the contacts 782 prepares the above described operating circuit for the relay 770, and the opening of the contacts 781 interrupts an additional point in the operating circuit for the reset relay 800. However, this relay does not release due to the holding circuit therefor completed through the closed contacts 802 and 812. The closure of the contacts 783 completes the above described energizing circuit for the mark pulse head 162 so that the first mark pulse in the group of mark pulses representing the value of the hundreds digit of the designation of the substation A is recorded on the magnetic tape 168.

Following a suitable time delay sufficient to complete all of the above described operations, the slow-to-release relay 810 releases to open the contacts 811 and 812. The opening of the contacts 811 removes one source of ground for the conductor 1099. The opening of the contacts 812 interrupts the holding circuit for the reset relay so that this relay releases to close the contacts 801, 804, and 805 and to open the contacts 802, 803, and 806. The closure of the contacts 801 prepares the above described operating circuit for the relay 810. The opening of the contacts 803 removes the biasing potentials from the prime tube 795 in the counting chain 850. The concurrent closure of the contacts 805 connects the cathodes of the tubes manifesting the digits "2" to "9," inclusive, and "0" to the common cathode resistor 798 to return the counting chain 850 to a normal operative condition. The closure of the contacts 804 connects the operating winding of the end-of-digit relay 760 to the anodes of the tubes 720, 740, 1010, and 1030 to provide an anode potential for all of these tubes and to permit the end-of-digit relay 760 to be operated thereby following the completion of the transmission of the group of mark pulses representing the value of the identified hundreds digit. The opening of the contacts 806 removes the negative potential from the control grids of the tubes 840 and 799 to place the multivibrator in operation and to permit the amplifier 799 to operate the pulsing relay 750. Accordingly, the operation of the reset relay 800 restores the counting chain 850 to its normal condition, restores the end-of-digit relay 760 and its associated control tubes 720, 740, 1010, and 1030 to their normal condition, and temporarily interrupts operation of the multivibrator and the pulsing relay 750 during the completion of the resetting operations. Therefore, the identifier sender 700 is now in a condition to initiate the transmission of the group of mark pulses representing the value of the identified hundreds digit.

Referring back to the preceding firing of the thousands digit stop tube 710, in addition to firing the tube 720 and operating the end-of-digit relay 760, the firing of this tube provides an enabling potential for the control electrode of the hundreds digit stop tube 730. More specifically, the positive voltage provided across the cathode resistor 711 is extended through a series resistor 717 to be applied to the control electrode of the hundreds digits stop tube 730. This potential enables only this tube of the stop tubes 730, 1000, and 1020 to be controlled by the counting chain 850 during the next cycle of operation in which the pulses representing the value of the hundreds digit of the directory number of the substation A are transmitted. In order to prevent the inadvertent firing of the stop tube 730 during the transmission of the pulse through the condenser 715 which fired the thousands digit stop tube 710, a condenser 716 is provided which delays the increase of voltage at the control grid of the tube 730 for a time interval sufficient to insure that the pulse firing the thousands digit stop tube 710 has been dissipated. Further, as described above, the closure of the contacts 761 in response to the operation of the end-of-digit relay 760 connects the control electrode of the hundreds digit stop tube 730 to ground to prevent the firing of the hundreds digit stop tube 730 during the resetting operations even though a positive potential is provided from the thousands digit stop tube 710. The release of the end-of-digit relay 760 to open the contacts 761 renders the positive bias provided by the tube 710 effective and enables the hundreds digit stop tube 730 to be fired under the control of the pulses supplied from the counting chain 850.

As described above, the hundreds digit register circuit 670 interconnects the control electrode of the hundreds digit stop tube 730 with the control anode of the prime or digit "1" manifesting tube 795 in the counting chain 850 since the value of the identified hundreds digit is "1." Therefore, when the pulsing relay 750 is first operated and released to render the tube 795 nonconducting and to fire the tube 845, the positive pulse provided by extinguishing the tube 795 is coupled through the condenser 731 to fire the hundreds digit stop tube 730, thereby providing a positive pulse which is coupled through a condenser 741 to fire the tube 740. Firing the tube 740 operates the end-of-digit relay 760 and causes the sequential operation of the relays 770, 780, 800, and 810, as described above, during which a single space pulse is recorded on the tape 168 of the trunk recorder 160 immediately following the single mark pulse representing the identified hundreds digit "1." The operation of these relay also resets the multivibrator and the counting chain 850 to a normal condition and extinguishes the tube 740 at the completion of these operations. Further, the firing of the hundreds digit stop tube 730 provides an enabling potential for the control electrode of the tens digit stop tube 1000, the application of which is retarded by a time delay circuit 732 similar to that provided by the elements 711, 712, and 716.

As set forth above, the tens digit register circuit 900 interconnects the control electrode of the tens digit stop tube 1000 with the anode of the "3" manifesting tube 855 in the counting chain 850 so that, following the transmission of three mark pulses representing an identified tens digit having a value of "3," a positive pulse is supplied from the tube 855 through the coupling condenser 1001 to fire the tens digit stop tube 1000. The firing of this tube provides a positive pulse which is coupled through a condenser 1011 to render the tube 1010 conductive. The firing of this tube operates the end-of-digit relay 760 and, accordingly, the relay 770, 780, 800, and 810, as described above, so that a space pulse is recorded on the magnetic tape 168 immediately following the three mark pulses representing the value of the identified tens digit of the directory number of the calling substation A. In addition, during this cycle of operation, operation of the pulsing relay 750 by the multivibrator is temporarily arrested, and the counting chain 850 is restored to its normal condition. In addition, firing the tens digit stop tube 1000 provides an enabling potential through a resistor 1003 to the control electrode of the units digit stop tube 1020, the application thereof being retarded by a time delay circuit 1002.

As set forth above in the illustrative example, the units digit register circuit 910 connects the control electrode of the units digit stop tube 1020 with the anode of the "4" manifesting tube 860 in the counting chain 850 through the cable 680 and the coupling condenser 1021. Accordingly, when intermittent operation of the multivibrator and of the pulsing relay 750 is initiated and following the transmission of four mark pulses to the mark pulse head 162 in the trunk recorder 160, the pulsing relay 750 operates to advance the counting chain 850 so that the "4" manifesting tube 860 is extinguished and the "5" manifesting tube 865 is rendered conductive to provide a positive pulse which is coupled through the condenser 1021 to fire the units digit stop tube 1020. The firing of this tube produces a current flow through the operating winding of a stop relay 1040, the operation of which signifies the completion of the transmission of the four digits forming the directory number of the calling substation A.

In operating, the stop relay 1040 opens the contacts 1042 and closes a pair of contacts 1041. The opening of the contacts 1042 removes one source of ground from the holding conductor 1099, but ground remains supplied thereto from the closed contacts 771. The closure of the contacts 1041 interconnects the anodes of the tubes 720, 740, 1010, and 1030 with the B+ potential supplied through the resistor 767 and through the operating winding of the end-of-digit relay 760, thereby providing a source of potential for maintaining the tube 1030 operated.

The firing of the tube 1020 also provides a positive pulse which is coupled through a condenser 1031 to fire the tube 1030 and to operate the end-of-digit relay 760 to close the contacts 761, 762, 763, 765, and 766 and to open the contacts 764. The closure of the contacts 761, 765, and 766 performs no useful function at this time inasmuch as all of the digit stop tubes 710, 730, 1000, and 1020 are fired. The closure of the contacts 763 prepares the above described pulsing path for the space pulse head 161, and the opening of the contacts 764 interrupts the above described energizing path for the mark pulse head 162. The closure of the contacts 762, as described above, operates the relay 810 to close the contacts 811 and 812. The closed contacts 811 supply ground to the conductor for maintaining the designation complete relay 820 operated, and the closure of the contacts 812 again provides a source of holding ground for the reset relay 800. When the pulsing relay 750 next releases under the control of the multivibrator, the closure of the contacts 752 completes the above described path for energizing the space pulse head 161 to record a space pulse on the magnetic tape 168 immediately following the group of four mark pulses representing the identified units digit "4." The opening of the contacts 753 releases the advance magnet 163, and the closure of the contacts 754 produces no useful function at this time.

The closure of the contacts 751 completes an operating circuit for the relay 770 extending through the closed contacts 782 so that this relay operates to open the contacts 771 and to close the contacts 772. The opening of the contacts 771 removes one source of ground from the conductor 1099, but ground is maintained thereon by the closed contacts 811. The closure of the contacts 772 prepares a holding path for the relay 770 and an operating path for the relay 780.

When the pulsing relay 750 is next operated, the opening of the contacts 752 terminates the energization of the space head 161, thereby completing the recording of the space pulse following the last digit of the designation of the calling substation A, and the concurrent closure of the contacts 753 operates the advance magnet 163 to advance the magnetic tape 168. The opening of the contacts 754, in advancing the counting chain 850, produces no useful function, but the opening of the contacts 751 removes the ground shunt around the operating winding of the relay 780 so that this relay operates in series with the relay 770 to close the contacts 781 and to open the contacts 782 and 783. The opening of the contacts 783 disables the pulsing paths extending to the mark and space pulse heads 162 and 161, and the opening of the contacts 782 interrupts the above described operating circuit for the relay 770, which relay remains operated over the holding path extending through the closed contacts 772. The closure of the contacts 781 again prepares an operating circuit for the reset relay 800.

When the pulsing relay 750 is next released, the operation of the contacts 752 and 754 produces no useful function, and the opening of the contacts 753 releases the advance magnet 163 to terminate the single step of advance movement of the magnetic tape 168 in the trunk recorder 160. The closure of the contacts 751 completes an operating circuit for the reset relay 800 so that this relay operates first to close the contacts 802 and then to open the contacts 801, 804, and 805 and to close the contacts 803 and 806. The opening of the contacts 801 interrupts the operating circuit for the relay 810, but this relay does not release due to the slow-to-release characteristic thereof. The opening of the contacts 804 disconnects the cathodes of the "2" to "9," inclusive, and "0" manifesting tubes in the counting chain 850 from ground so that the conductive tube therein is extinguished. The closure of the contacts 803 primes the "1" manifesting tube 795 into a conductive state. The closure of the contacts 806 renders the amplifier 799 and, accordingly, the pulsing relay 750 inoperative, and this negative potential also prevents the multivibrator from further cyclic operation by maintaining the tube 840 in a substantially nonconductive state. The opening of the contacts 804 disconnects the winding of the end-of-digit relay 760 from the anode of the conductive tube 1030, but this tube and relay both remain operated over the holding path provided by the closed contacts 1041.

The identifier sender 700 remains in this condition until such time as, following a suitable time delay, the slow-to-release relay 810 releases to open the contacts 811 and 812. The opening of the contacts 812 opens the holding circuit for the relay 800, but this time the relay remains operated on the ground supplied to its lower winding from the contacts 762. The opening of the contacts 811 removes the last source of ground from the holding conductor 1099 to interrupt the operating circuit for the designation complete relay 820 so that this relay releases to close the contacts 821 and to open the contacts 822, 823, 824, 825, 826, 827, 828 and 829.

The opening of the contacts 828 and 829 disables the multivibrator including the tubes 840 and 850 and also the amplifier 799 by disconnecting the cathodes thereof from ground to prevent further transmitting operations of the identifier sender 700. The opening of the contacts 825, 826, and 827 disconnects the advance relay 230 in the trunk circuit 210 and the space and mark pulse heads 161 and 162 from the pulsing paths provided in the identifier sender 700. The opening of the contacts 824 removes the source of holding ground from the plurality of operated register relays in the registers 660, 670, 900, and 910, similar to the operated relays 630 and 640, so that these relays release to open the plurality of contacts including the contacts 631–636 and 641–646. The opening of the contacts 822 opens, at an additional point, a circuit for applying ground to the kickoff relay 1230 in the identifier sender allotter 1200.

The closure of the contacts 821 serves to restore the trunk finder switch 1100 to its normal position by completing an operating circuit for the reset magnet 1160 thereof which extends from the closed and grounded contacts 601 through the closed contacts 821 and either of the off normal contacts 1144 or 1152. As described above, the operation of the reset magnet 1160 restores the wipers 830, 831, 832, 833, and 834 to a normal condition in addition to restoring the off normal contacts forming a portion of the trunk finder switch 1100 to their normal position. Accordingly, the release of the designation complete relay 820 in response to the completion of the transmission of the digital information from the identifier sender 700 to the trunk recorder 160 results in restoring the trunk finder switch 1100 to its normal position.

The release of the designation complete relay 820 also opens the contacts 823 so that the B+ operating potential is removed from the plurality of digit stop tubes 710, 730, 1000, and 1020 to extinguish these tubes. Rendering the tube 1020 nonconductive interrupts the operating circuit for the stop relay 1040 so that this relay releases to open the contacts 1041 and to close the contacts 1042. The closure of the contacts 1042 again applies ground to the hold conductor 1099, but since the register relays in the registers 660, 670, 900, and 910 have been released, an operating circuit for the designation complete relay 820 is not completed at this time.

The opening of the contacts 1041 interrupts the operating circuit for the end-of-digit relay 760 so that this relay releases to open the contacts 761, 762, 763, 765, and 766 and to close the contacts 764. The opening of the contacts 761, 765, and 766 removes the ground shunt applied to the control electrodes of the stop tubes 730, 1000, and 1020. The closure of the contacts 764 prepares the above described pulsing circuit for the mark pulse head of an associated trunk recorder, and the opening of the contacts 763 interrupts the above described circuit for energizing the space pulse head in an associated trunk recorder. The opening of the contacts 762 removes holding and operating ground from the windings of the relays 770 and 780 so that these relays release to close the contacts 771, 782, and 783 and to open the contacts 772 and 781. The closure of the contacts 771 provides another source of ground for the conductor 1099, and the closure of the contacts 783 prepares an additional portion of the mark and space head pulsing circuits. The closure of the contacts 782 prepares the above described operating circuit for the relay 770, and the opening of the contacts 772 interrupts the holding circuit therefor. The opening of the contacts 781 interrupts the operating circuit for the reset relay 800 so that this relay releases.

In releasing, the reset relay closes the contacts 801, 804, and 805 and opens the contacts 802, 803, and 806. The closure of the contacts 801 prepares an operating circuit for the relay 810, and the opening of the contacts 802 interrupts a point in the holding circuit for the reset relay 800. The opening of the contacts 803 removes the priming potential from the control electrode of the prime tube 795 in the counting chain 850, and the closure of the contacts 804 again interconnects the end-of-digit relay 760 with the anodes of the tubes 720, 740, 1010, and 1030. The closure of the contacts 805 connects the cathodes of the counting tubes in the chain 850 with the common cathode resistor 798 to restore the counting chain 850 to its normal condition. The opening of the contacts 806 removes the negative bias from the amplifier 799 and from the tube 840 in the multivibrator to prepare these components for supplying pulses the next time that the identifier sender 700 is seized.

Accordingly, in response to the completion of the transmission of the digits forming the designation of the calling substation, the stop relay 1040 is operated to cause the identifier sender 700 to supply a space pulse following the last group of mark pulses transmitted to the associated trunk recorder and to thereafter release the designation complete relay 820. The release of this relay restores the stop tubes in the identifier sender 700 to their normal condition and also operates the reset magnet 1160 in the trunk finder switch 1100 to restore the trunk finder switch to its normal position. Incident to these resetting operations, the stop relay and the remaining relays and tubes including the register relays are restored to a normal condition to permit the identifier sender 700 to be seized and utilized in establishing identifications of subscribers involved in subsequently placed toll calls.

Following the release of the seized identifier sender 700, the trunk circuit 210 provides a trunk recorder 160 with a plurality of discrete signals indicating the duration of the toll call. At the termination of the connection, the extended switch train including the components 100, 102, 103, 210, and 220 is released, and the recording of the duration information in the trunk recorder 160 is terminated. In a similar manner, items of information pertaining to subsequent calls extended through the trunk circuit 210 are collected and stored in the trunk recorder 160.

The items of information pertaining to the plurality of toll calls stored in the plurality of trunk recorders, similar to the recorders 160 and 207, which relates to the toll calls extended from the office including the Clearbrook exchange, are recorded in permanent form by a recorder under the control of registers and control circuits which may be of the type shown and described in the above identified Morris et al. patent or the copending application of F. A. Morris et al., Serial No. 536,571. During these readout or playback operations, erasing means (not shown) in the trunk recorders remove the recorded items of information from the magnetic tapes so that these tapes can be utilized to store information pertaining to another group of toll calls.

Although the operation of the data storing and transmitting means of the present invention is described above in conjunction with particular means for extending connections and for selecting, storing, and recording data pertaining to toll calls, it should be understood that many other modifications and embodiments can be provided by those skilled in the art which will fall within the spirit and scope of the principles of the present invention.

What is claimed and desired to be secured by Letters Patent of the United States is:

1. In a telephone system including line identifying means for simultaneously supplying discrete signals representative of a plurality of digits forming the designation of a calling line, a plurality of groups of register relays, each of said groups being controlled by one of said signals to register one of the digits of the calling line designation, a plurality of control paths established by said register relays in accordance with the registered digits, a source of pulses, counting means common to said control paths and operated by pulses from said source, designation storing means, means for synchronously applying pulses from said source to said counting means and to said designation storing means, and stop means including one of said control paths responsive to the application of a predetermined number of pulses representing one of said digits to said counting means for rendering said source of pulses ineffective to supply pulses to said counting means and to said designation storage means and for resetting said counting means to a normal condition.

2. The system defined by claim 1 in which means are provided responsive to the application of said predetermined number of pulses to said counting means for rendering said one control path ineffective and for rendering another one of said control paths effective to control the operation of said stop means.

3. The system defined by claim 1 in which the stop means includes means for supplying a control signal to said designation storing means following the application of the pulses thereto representing the digit of the designation.

4. The system defined by claim 1 in which the source of pulses comprises a multivibrator and the means for synchronously applying pulses to the designation storing means and to the counting means includes means for placing the multivibrator in operation in response to the registration of a digit of the calling line designation in each of said groups of register relays.

5. In a telephone system including line identifying means for supplying signals representing the digits of the designation of a calling line, a plurality of separate registers controlled by said signals, each of said registers being adapted to register one of the digits of the calling line designation and to establish a control path in accordance with the value of the registered digit, a source of pulses, counting means including a plurality of translating devices adapted to be rendered conductive in succession, said devices being connected to all of said control paths, designation storing means operated by pulses from said source to store the designation of a calling line, means for applying pulses from said source to said designation storing means to store the digits of said designation, means for operating said counting means in synchronism with the application of pulses to said designation storing means, stop means common to all of said control paths for intermittently terminating the application of pulses to said designation storing means, and separate translating means associated with each of said registers and controlled by the translating devices in said counting means and by said control paths for operating said stop means following the storage of each digit of said designation in said designation storing means.

6. In a telephone system including calling line identifying means for supplying signals representing the digits of the designation of a calling line, a plurality of registers controlled by said signals for registering the digits of said designation, said registers establishing control paths representing the values of the registered digits, counting means including successively operated translating devices, designation storing means, pulsing means for synchronously operating said counting means and said storing means to store the registered digits in said storing means, stop means for interrupting operation of said pulsing means, translating means associated with each of said registers and operated under the control of said translating devices and said control paths for operating said stop means after each registered digit has been stored in said storing means, and circuit means interconnecting said translating means to permit the translating means associated with different registers to be sequentially rendered effective to operate said stop means.

7. In a telephone system including calling line identifying means for supplying signals representing the digits of the designation of a calling line, a plurality of registers controlled by said signals for registering the digits of said designation and for establishing control paths in accordance with the registered digits, counting means including a plurality of electronic devices adapted to be rendered successively conductive, designation storing means for storing the designation of said calling line, pulsing means for sequentially rendering said electronic devices conductive and for operating said storing means in synchronism with said counting means to store the digits of said designation, stop means controlled by said counting means and said control paths for interrupting operation of said pulsing means after each digit of said designation is stored in said storing means, and means including said stop means for extinguishing said electronic devices following each operation of said stop means.

8. In a telephone system, a plurality of digit registers for establishing control paths in accordance with the values of the digits registered, signaling means for transmitting signals representative of the registered digits, counting means including a plurality of successively fired electronic devices connected in common to all of said control paths and operated in a timed relation with said signaling means, means for initiating operation of said signaling means in response to the registration of digits in said digit registers, stop means for momentarily arresting operation of said signaling means and for extinguishing said electronic devices following the transmission of signals representing each of the registered digits, and separate electronic means individual to each of said digit registers and connected to the control path established therein for operating said stop means.

9. The system set forth in claim 8 in which the said separate electronic means and their associated digit registers are denominationally ordered and in which circuit means are provided interconnecting said separate electronic means so that the circuit means render the electronic means associated with a given digit register effective to control the stop means following the transmission of the signals representing the registered digit in the next highest denominational order.

10. A signaling apparatus comprising a register for storing a digit and for selectively rendering one of a plurality of digit representing control paths effective in accordance with the value of the digit registered, a counting chain including a plurality of translating devices interconnected for sequential operation, each of said translating devices being associated with one of said control paths, a multivibrator for operating said counting chain and for supplying signals representing said registered digit, means responsive to the storage of a digit in said register for placing said multivibrator in operation to advance said counting chain by sequentially operating said translating devices, and stop means connected to all of said control paths and operated in response to the operation of the translating device associated with the control path selectively rendered effective by said register, said stop means rendering said multivibrator ineffective to supply digit representing signals and restoring the translating devices in said counting chain to a normal condition.

11. The apparatus defined in claim 10 in which the stop means comprises translating means having a control element connected to all of said control paths so that the operation of the translating device connected to the control path rendered effective by the register operates the translating means to actuate the stop means.

12. A signaling apparatus comprising a plurality of registers for storing digits, each of said registers selectively rendering one of a plurality of control paths effective in accordance with the value of the digit stored therein, counting means including a plurality of successively operated devices, each of said devices being connected to one of said control paths in each of said registers, signaling means for supplying digit representing signals and for successively operating the devices in said counting means, a plurality of detecting means, each of said detecting means being connected to all of the control paths in one of the registers so as to be operated to render the signaling means ineffective when the device connected to the effective control path in the associated register is operated, and circuit means interconnecting said detecting means for sequentially rendering said detecting means effective to control the signaling means in a predetermined order.

13. The apparatus defined by claim 12 in which the detecting means include electronic devices each having a control electrode adapted to receive an operating signal from the effective one of the control paths selected by the associated register, and in which the circuit means comprises means responsive to the operation of one of said electronic devices for changing the effective bias on the control electrode of the electronic device associated with another register.

14. A signaling apparatus for transmitting a plural digit entry comprising a counting means including a plurality of counting stages, a signaling channel, a signal source for synchronously operating said counting means and applying signals to said signaling channel, a plurality of stop means for at least momentarily arresting the operation of said signal source, one of said stop means being provided for each of the digits in said entry, a plurality of digit registers each adapted to store one of the digits in said entry, means controlled by each of said digit registers for connecting the related one of said stop means to one of said counting stages in accordance with the value of the digit stored in said digit register, and means including said stop means for rendering different ones of said stop means responsive to control by said counting means in a sequence corresponding to the sequence in which the stored digits appear in said plural digit entry.

15. A signaling apparatus for transmitting a plural digit entry comprising a counting means including a plurality of controlled conduction devices operable to receive different patterns of on and off conductive conditions representing different digits, a signaling channel, a signal source connected to said signaling channel and said counting means for applying signals to said channel and for operating said counting means to said different patterns in accordance with the signals applied to said channel, stop means for controlling the effectiveness of said signal source to apply signals to said channel and to operate said counting means, said stop means including a plurality of controlled conduction devices each having a control electrode, a plurality of digit registers each adapted to store one of the digits in said entry, means controlled by each of said registers for supplying an operating signal to one of said control electrodes under the joint control of the value of the digit stored in the associated register and the setting of the counting means so that the related controlled conduction device is operated to actuate the stop means, and circuit means connected to the controlled conduction devices in said stop means to render these controlled conduction devices effective in sequence.

16. The signaling apparatus set forth in claim 15 in which each of the controlled conduction devices in said stop means includes an output electrode, and in which said circuit means connects the output electrode of a preceding one of the controlled conduction devices in the stop means to the control electrode of a succeeding one of these controlled conduction devices so that the operation of the preceding device provides an enabling potential for the control electrode of the succeeding device.

References Cited in the file of this patent

UNITED STATES PATENTS

| | | |
|---|---|---|
| 2,562,717 | Holden | July 31, 1951 |
| 2,672,519 | Baker et al. | Mar. 16, 1954 |